(12) United States Patent
Splaine et al.

(10) Patent No.: US 11,997,332 B2
(45) Date of Patent: *May 28, 2024

(54) METHODS AND APPARATUS TO ASSOCIATE AUDIENCE MEMBERS WITH OVER-THE-TOP DEVICE MEDIA IMPRESSIONS

(71) Applicant: The Nielsen Company (US), LLC, New York, NY (US)

(72) Inventors: Steven J. Splaine, Tampa, FL (US); Harith Gandhi, Tampa, FL (US); Kevin K. Gaynor, Sunnyvale, CA (US); Gangadhar Jakkula, Tampa, FL (US); Narasimha Reddy Goli, Tampa, FL (US); Chris Nicotra, Holiday, FL (US); Kumar Rao, Fremont, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,519

(22) Filed: Sep. 30, 2020

(65) Prior Publication Data

US 2021/0021887 A1 Jan. 21, 2021

Related U.S. Application Data

(63) Continuation of application No. 15/821,507, filed on Nov. 22, 2017, now Pat. No. 10,834,449.
(Continued)

(51) Int. Cl.
*H04N 21/258* (2011.01)
*G06F 16/78* (2019.01)
(Continued)

(52) U.S. Cl.
CPC ....... *H04N 21/25883* (2013.01); *G06F 16/78* (2019.01); *H04N 21/25841* (2013.01);
(Continued)

(58) Field of Classification Search
CPC ....... H04N 21/25883; H04N 21/25841; H04N 21/44213; H04N 21/812; G06F 16/78;
(Continued)

(56) References Cited

U.S. PATENT DOCUMENTS 7,929,552 B2 4/2011 Streijl et al.
8,010,089 B2 8/2011 Israel et al.
(Continued)

FOREIGN PATENT DOCUMENTS

| CA | 2744580 | 12/2012 |
| WO | 2012033669 | 3/2012 |
| WO | 2014172472 | 10/2014 |

OTHER PUBLICATIONS

Downing et. al., "Business Statistics," Barron's Educational Series, 4$^{th}$ Edition, pp. 226-227, 2003, 1 page.
(Continued)

*Primary Examiner* — Yassin Alata

(57) ABSTRACT

Methods and apparatus to associate audience members with over-the-top device media impressions. An example audience measurement apparatus includes a reporting message receiver to receive a first reporting message from a client device coupled to a residential gateway having an internet protocol (IP) address. An AME ID determiner is to assign an audience measurement entity (AME) identifier to the IP address provided by the received first reporting message. A redirect instructor is to send a redirect instruction to the client device to cause the client device to send a second reporting message to a database proprietor, the redirect instruction to include the AME identifier and the IP address.

(Continued)

A DP message reporting receiver is to receive, in response to the sent redirect instruction, a third reporting message from the database proprietor that includes a database proprietor (DP) identifier.

20 Claims, 24 Drawing Sheets

Related U.S. Application Data

(60) Provisional application No. 62/455,406, filed on Feb. 6, 2017, provisional application No. 62/441,238, filed on Dec. 31, 2016.

(51) Int. Cl.
| | |
|---|---|
| *H04N 21/442* | (2011.01) |
| *G06Q 30/0204* | (2023.01) |
| *G06Q 30/0241* | (2023.01) |
| *G06Q 30/0242* | (2023.01) |
| *H04N 21/81* | (2011.01) |

(52) U.S. Cl.
CPC ... *H04N 21/44213* (2013.01); *G06Q 30/0204* (2013.01); *G06Q 30/0241* (2013.01); *G06Q 30/0246* (2013.01); *H04N 21/812* (2013.01)

(58) Field of Classification Search
CPC ........... G06Q 30/0204; G06Q 30/0241; G06Q 30/0246
See application file for complete search history.

(56) References Cited

U.S. PATENT DOCUMENTS

| | | | |
|---|---|---|---|
| 8,019,777 B2 | 9/2011 | Hauser | |
| 8,145,754 B2 | 3/2012 | Chamberlain et al. | |
| 8,291,073 B2 | 10/2012 | Campbell et al. | |
| 8,307,006 B2 | 11/2012 | Hannan et al. | |
| 8,370,489 B2 | 2/2013 | Mazumdar et al. | |
| 8,626,901 B2 | 1/2014 | Pugh et al. | |
| 8,661,119 B1 | 2/2014 | Jindal et al. | |
| 8,812,012 B2 | 8/2014 | Besehanic et al. | |
| 8,825,662 B1 | 9/2014 | Kingman et al. | |
| 8,903,864 B2 | 12/2014 | Hannan et al. | |
| 8,910,195 B1 | 12/2014 | Barney et al. | |
| 8,954,536 B2 | 2/2015 | Kalus et al. | |
| 8,954,567 B1 | 2/2015 | Skvortsov et al. | |
| 8,996,727 B2 | 3/2015 | Defrancesco | |
| 9,118,542 B2 | 8/2015 | Srivastava et al. | |
| 9,197,929 B2 | 11/2015 | Volovich et al. | |
| 9,210,222 B2 | 12/2015 | Field | |
| 9,215,288 B2 | 12/2015 | Seth et al. | |
| 9,292,606 B1 | 3/2016 | Kingman, Jr. et al. | |
| 9,331,921 B2 | 5/2016 | DeFrancesco et al. | |
| 9,430,778 B2 | 8/2016 | Barber | |
| 9,621,446 B2 | 4/2017 | Pugh et al. | |
| 10,305,746 B2 | 5/2019 | Ganjam et al. | |
| 10,423,985 B1 | 9/2019 | Dutta et al. | |
| 10,834,449 B2 | 11/2020 | Splaine et al. | |
| 10,841,167 B2 | 11/2020 | Ganjam et al. | |
| 2008/0281699 A1* | 11/2008 | Whitehead ........ H04N 21/23106 |
| | | | 705/14.73 |
| 2008/0300965 A1 | 12/2008 | Doe | |
| 2009/0259525 A1 | 10/2009 | Harrington | |
| 2009/0299843 A1 | 12/2009 | Shkedi | |
| 2010/0094758 A1 | 4/2010 | Chamberlain | |
| 2010/0191577 A1 | 7/2010 | Lu et al. | |
| 2010/0191689 A1 | 7/2010 | Cortes et al. | |
| 2010/0313009 A1 | 12/2010 | Combet et al. | |
| 2012/0084828 A1* | 4/2012 | Rowe ............... H04N 21/44222 |
| | | | 725/110 |
| 2012/0239809 A1 | 9/2012 | Mazumdar et al. | |
| 2013/0014137 A1 | 1/2013 | Bhatia et al. | |
| 2013/0117773 A1 | 5/2013 | Davies | |
| 2013/0326554 A1 | 12/2013 | Shkedi | |
| 2013/0332604 A1* | 12/2013 | Seth ........................ H04L 67/22 |
| | | | 709/224 |
| 2014/0149577 A1* | 5/2014 | Monighetti ........... H04L 67/535 |
| | | | 709/224 |
| 2014/0229268 A1 | 8/2014 | Clapp et al. | |
| 2014/0229970 A1* | 8/2014 | Besehanic ........ H04N 21/25883 |
| | | | 725/20 |
| 2014/0289862 A1 | 9/2014 | Gorfein et al. | |
| 2014/0317114 A1 | 10/2014 | Alla et al. | |
| 2014/0379599 A1 | 12/2014 | Feininger | |
| 2015/0074579 A1 | 3/2015 | Gladstone et al. | |
| 2016/0112522 A1 | 4/2016 | Abello et al. | |
| 2016/0225002 A1* | 8/2016 | Splaine ............. G06Q 30/0204 |
| 2016/0260129 A1 | 9/2016 | Fadeev et al. | |
| 2016/0275563 A1 | 9/2016 | Sankaran et al. | |
| 2017/0034592 A1 | 2/2017 | Ray et al. | |
| 2017/0034593 A1 | 2/2017 | Ray et al. | |
| 2018/0192104 A1* | 7/2018 | Splaine ............ H04N 21/44213 |
| 2019/0379924 A1* | 12/2019 | Massoudi ............. H04L 67/306 |

OTHER PUBLICATIONS

United States Patent and Trademark Office, "Requirement for Restriction and/or Election," issued in connection with U.S. Appl. No. 15/821,507, dated Aug. 28, 2018, 5 pages.

United States Patent and Trademark Office, "Non-Final Office Action," issued in connection with U.S. Appl. No. 15/821,507, dated Jan. 31, 2019, 14 pages.

United States Patent and Trademark Office, "Non-Final Office Action," issued in connection with U.S. Appl. No. 15/821,507, dated Feb. 6, 2020, 14 pages.

United States Patent and Trademark Office, "Notice of Allowance and Fee(s) Due," issued in connection with U.S. Appl. No. 15/821,507, dated Jul. 8, 2020, 10 pages.

United States Patent and Trademark Office, "Final Office Action", issued in connection with U.S. Appl. No. 15/821,507, dated Jun. 17, 2019, 15 Pages.

\* cited by examiner

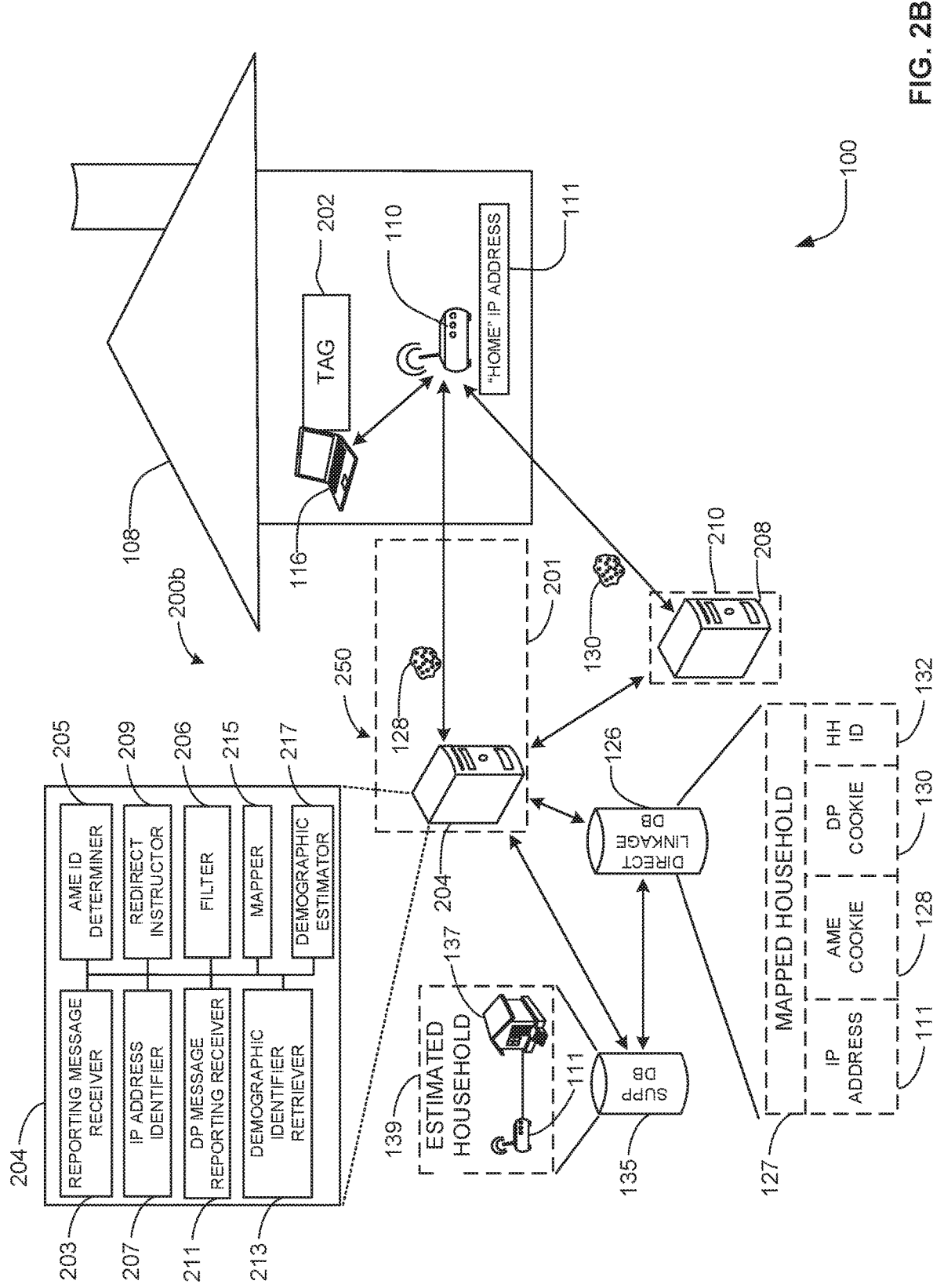

TABLE 1: SAMPLE HOUSEHOLD COMPOSITION

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| IP ADDRESS | AGE | GENDER | AGE | GENDER | AGE | GENDER | AGE | GENDER | AGE | GEND. | AGE | GEND. | AGE | GEND. |
| 47.198.12.08 | 45 | MALE | 43 | FEMALE | 15 | GIRL | 12 | GIRL | | | | | | |
| 47.198.12.64 | 28 | MALE | 28 | FEMALE | | | | | | | | | | |
| 47.198.12.85 | 54 | MALE | 50 | FEMALE | 21 | FEMALE | 10 | BOY | 13 | BOY | 15 | BOY | 17 | BOY |
| 47.198.12.124 | 24 | FEMALE | | | | | | | | | | | | |
| 47.198.12.186 | 20 | MALE | 20 | FEMALE | 21 | MALE | 22 | MALE | | | | | | |
| 47.198.12.236 | 35 | MALE | 36 | FEMALE | 5 | BOY | 7 | GIRL | | | | | | |
| 47.198.18.34 | 24 | MALE | | | | | | | | | | | | |
| 47.198.18.186 | 25 | MALE | | | | | | | | | | | | |
| 47.198.18.231 | 25 | MALE | | | | | | | | | | | | |
| 47.198.18.86 | 28 | MALE | | | | | | | | | | | | |
| 47.198.18.88 | 45 | MALE | | | | | | | | | | | | |
| 47.198.18.54 | 56 | MALE | | | | | | | | | | | | |
| 47.198.18.135 | 65 | MALE | | | | | | | | | | | | |
| 47.198.18.123 | 22 | FEMALE | | | | | | | | | | | | |
| 47.198.18.23 | 35 | FEMALE | | | | | | | | | | | | |
| 47.198.18.212 | 28 | MALE | 27 | FEMALE | | | | | | | | | | |
| 47.198.18.167 | 30 | MALE | 32 | FEMALE | | | | | | | | | | |
| 47.198.18.198 | 25 | MALE | 25 | FEMALE | | | | | | | | | | |
| 47.198.18.147 | 54 | MALE | 53 | FEMALE | | | | | | | | | | |
| 47.198.18.199 | 71 | MALE | 68 | FEMALE | | | | | | | | | | |
| 47.198.18.67 | 31 | MALE | 29 | FEMALE | 2 | BOY | | | | | | | | |
| 47.198.18.12 | 26 | MALE | 27 | FEMALE | 4 | BOY | | | | | | | | |
| 47.198.18.45 | 30 | MALE | 24 | FEMALE | 1 | GIRL | | | | | | | | |
| 47.198.18.213 | 26 | MALE | 29 | FEMALE | 2 | GIRL | | | | | | | | |
| 47.198.18.31 | 42 | MALE | 41 | FEMALE | 15 | GIRL | | | | | | | | |
| 47.198.18.56 | 35 | MALE | 22 | FEMALE | 6 | BOY | 4 | GIRL | | | | | | |
| 47.198.18.129 | 51 | MALE | 48 | FEMALE | 14 | BOY | 15 | GIRL | | | | | | |
| 47.198.18.194 | 45 | MALE | 47 | FEMALE | 15 | BOY | 17 | GIRL | | | | | | |
| 47.198.18.5 | 31 | MALE | 27 | FEMALE | 3 | BOY | 5 | BOY | | | | | | |
| 47.198.18.39 | 38 | MALE | 39 | FEMALE | 12 | BOY | 14 | BOY | | | | | | |
| 47.198.18.187 | 42 | MALE | 41 | FEMALE | 15 | GIRL | 16 | GIRL | | | | | | |
| 47.198.18.172 | 36 | MALE | 34 | FEMALE | 6 | GIRL | 4 | GIRL | | | | | | |
| 47.198.18.21 | 41 | FEMALE | 14 | BOY | 15 | GIRL | | | | | | | | |
| 47.198.18.58 | 39 | FEMALE | 16 | BOY | 8 | GIRL | 10 | GIRL | | | | | | |
| 47.198.18.149 | 41 | FEMALE | 14 | BOY | 15 | GIRL | 15 | GIRL | | | | | | |
| 47.198.18.181 | 34 | MALE | 12 | BOY | | | | | | | | | | |
| 47.198.18.212 | 38 | MALE | 35 | FEMALE | 8 | BOY | 9 | BOY | 12 | GIRL | 13 | GIRL | | |
| 47.198.18.245 | 42 | MALE | 37 | FEMALE | 4 | BOY | 6 | BOY | 8 | BOY | 14 | GIRL | | |

FIG. 2C

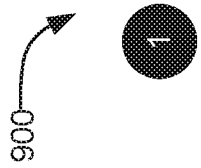

FIG. 9A

CONNECTING IP ADDRESSES TO EXPERIAN COOKIES

1) BROWSER DOWNLOADS WEB PAGE CONTAINING A MEASUREMENT TAG [E.G., A DAR TAG OR OTHER MEDIA MEASUREMENT TAG] [ASSUME IMAGE TAG]

2) MEASUREMENT TAG FIRES TO NIELSEN CENSUS COLLECTION SEVERS [NIELSEN COOKIE IS RETRIEVED – IF PRESENT]

3) CENSUS FIRES A HTTP 302 REDIRECT TO EXPERIAN COLLECTION SERVERS [ADDING CENSUS SESSION ID TO URL QUERY STRING]

4) EXPERIAN COLLECTION RETRIEVES THE EXPERIAN COOKIE – IF PRESENT, & FIRES REDIRECT BACK TO NIELSEN [ADDING EXPERIAN COOKIE ID TO URL QUERY STRING]

5) CENSUS COLLECTS RETURNED PING & WRITES OUT MAPPING RECORD: IP ADDRESS, NIELSEN COOKIE ID, NIELSEN SESSION ID, & EXPERIAN COOKIE ID

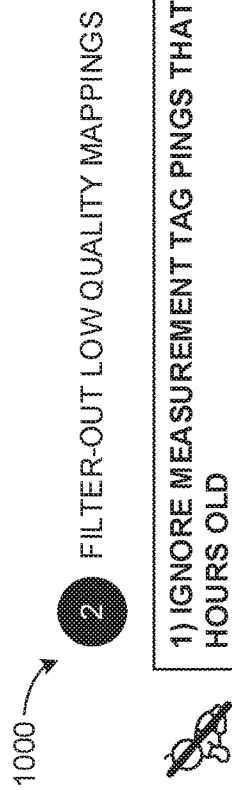

| ② FILTER-OUT LOW QUALITY MAPPINGS |
|---|
| 1) IGNORE MEASUREMENT TAG PINGS THAT HAVE A NIELSEN COOKIE THAT IS LESS THAN 48 HOURS OLD |
| 2) IGNORE MDAR PINGS (MOBILE DEVICES) |
| 3) IGNORE DAR PINGS FROM MOBILE WEB (DETERMINED BY HTTP UA) |
| 4) IGNORE PINGS FROM US BUSINESS, CELLULAR, OR INTERNATIONAL IP ADDRESSES (DETERMINED VIA NETACUITY) |
| 5) IGNORE PINGS FROM SUSPECTED ROBOTS |
| 6) IGNORE PINGS FROM SUSPECTED NON-RESIDENTIAL IP ADDRESSES (DETERMINED BY # OF UNIQUE NIELSEN COOKES) (E.G., STARBUCKS, NEIGHBOURHOODS USING IPV4 NATS, STADIUMS, ETC.) |
| 7) IGNORE PINGS COLLECTED DURING NORMAL BIZ HOURS FOR THAT DMA (DMA DETERMINED VIA NETACUITY) (E.G., 9 AM TO 5 PM (M-F) LOCAL TIMEZONE |
| 8) FOR NIELSEN COOKIES THAT HAVE MULTIPLE IP ADDRESSES; IGNORE PIGNS FROM SECONDARY IP ADDRESSES |
| 9) (AFTER APPLYING PRIOR FILTERS) IGNORE COOKIES THAT HAVE LESS THAT X# OF PINGS (E.G., ELIMINATE DHCP HOUSEHOLDS WITH FREQUENT IP ADDRESS TURNOVER) |

FIG. 10

| EXAMPLE |
|---|
| INTERNET PROTOCOL VERSION 4 (IPV4) IS CURRENTLY USED BY THE MAJORITY OF INTERNET CONNECTED DEVICES WITHIN THE US TO CONNECT TO THE INTERNET EN.WIKIPEDIA.ORG/WIKI/IPV4 |
| AN IPV4 ADDRESS IS COMPOSED OF 4 OCTETS (GROUPS OF NUMBERS), EACH OCTET SPANNING ZERO TO 255. FOR EXAMPLE, 47.198.12.50 |
| TO OPTIMIZE NETWORK ADMINISTRATION & UTILIZATION, IP ADDRESSES ARE ASSIGNED TO INTERNET SERVICE PROVIDERS (ISP) IN BLOCKS OF CONTIGUOUS IP #'S (RANGES). |
| ISP'S WILL TYPICALLY ASSIGN IP ADDRESSES WITH THE SAME FIRST 3 OCTETS TO THE SAME GEOGRAPHIC REGION IE X.X.X.000 TO X.X.X.255 |
| BUILDING UPON THE EXISTING IP ADDRESS TO EXPERIAN HOUSEHOLD ID METHODOLOGY, WE CAN USE THIS ISP IP ASSIGNMENT PREFERENCE TO ESTIMATE THE DEMOGRAPHICS OF RESIDENTIAL IP ADDRESSES THAT DO NOT HAVE AN EXISTING REFERENCE EXPERIAN HH ID. |

PROCESS IMPLEMENTATION – OPTION #1

- FOR EACH RESIDENTIAL IPV4 ADDRESS (OR IPV6 ADDRESS) THAT IS NOT MATCHED TO AN EXPERIAN HOUSEHOLD ID.
- IDENTIFY THE SET OF RESIDENTIAL IPV4 ADDRESSES THAT HAVE THE SAME FIRST 3 OCTETS, AND KNOWN (MAPPED) EXPERIAN HH ID'S
- FOR EACH KNOWN EXPERIAN HOUSEHOLD, RETRIEVE THE DEMOGRAPHIC MIX FOR THAT HOUSEHOLD.
- ESTIMATE COMPOSITION OF NON-EXPERIAN HOUSEHOLDS BASED ON NEIGHBORING EXPERIAN HOUSEHOLDS.

| | |
|---|---|
| 47.198.12.08 | 2 ADULT (1 MALE, 1 FEMALE), 2 CHILDREN (1 MALE, 1 FEMALE) |
| 47.198.12.64 | 2 ADULT (1 MALE, 1 FEMALE), 0 CHILDREN |
| 47.198.12.85 | 3 ADULT (2 MALE, 1 FEMALE), 2 CHILDREN (2 MALE) |
| 47.198.12.124 | 1 ADULT (1 FEMALE), 0 CHILDREN |
| 47.198.12.186 | 4 ADULT (3 MALE, 1 FEMALE), 0 CHILDREN |
| 47.198.12.236 | 2 ADULT (1 MALE, 1 FEMALE), 2 CHILDREN (1 MALE, 1 FEMALE) |

E.G., SAME GEOGRAPHIC REGION OF EXPERIAN HH IDs

PROCESS IMPLEMENTATION CONTINUED

- USING THE KNOWN SET OF DEMOGRAPHICS, COMPUTE THE AVERAGE (MEAN) COMPOSITION OF THE SET OF KNOWN HOUSEHOLDS PERSON AND GENDERS. FOR EXAMPLE, USING THE SET BELOW:

- 8 MALES/6 HOUSEHOLDS = ROUND(1.25) -> 1 MALE
  - 5 FEMALES/6 HOUSEHOLDS = ROUND(0.8) -> 1 FEMALE
  - 6 BOYS/6 HOUSEHOLDS = ROUND(1.0) -> 1 BOY
  - 2 GIRLS/6 HOUSEHOLDS = ROUND(0.3) -> 0 GIRLS

| | |
|---|---|
| 47.198.12.08 | 2 ADULT (1 MALE, 1 FEMALE), 2 CHILDREN (1 MALE, 1 FEMALE) |
| 47.198.12.64 | 2 ADULT (1 MALE, 1 FEMALE), 0 CHILDREN |
| 47.198.12.85 | 3 ADULT (2 MALE, 1 FEMALE), 2 CHILDREN (2 MALE) |
| 47.198.12.124 | 1 ADULT (1 FEMALE), 0 CHILDREN |
| 47.198.12.186 | 4 ADULT (3 MALE, 1 FEMALE), 0 CHILDREN |
| 47.198.12.236 | 2 ADULT (1 MALE, 1 FEMALE), 2 CHILDREN (1 MALE, 1 FEMALE) |

1700

PROCESS IMPLEMENTATION CONTINUED

- USING THE KNOWN SET OF DEMOGRAPHICS, COMPUTE THE AVERAGE (MEAN) COMPOSITION OF THE SET OF KNOWN HOUSEHOLDS PERSON AND GENDERS. FOR EXAMPLE, USING THE SET BELOW:
  - MALE (MEAN) AGE = 45+28+54+20+20+21+22+35 = 245/8 = 43
  - FEMALE (MEAN) AGE = 43+28+21+24+35 = 151/5 = 30
  - BOY (MEAN) AGE = 15+10+13+15+17 = 70/5 = 14
  - GIRL (MEAN) AGE = 12+7 = 19/2 = 10

47.198.12.08       45 MALE, 43 FEMALE, 15 BOY, 12 GIRL
47.198.12.64       28 MALE, 28 FEMALE
47.198.12.85       54 MALE, 50 & 21 FEMALE, 10, 13, 15, 17 BOYS
47.198.12.124      24 FEMALE
47.198.12.186      20, 20, 21, 22 MALE
47.198.12.236      35 MALE, 36 FEMALE, 5 BOY, 7 GIRL

PROCESS IMPLEMENTATION – OPTION #2

OPTION 1 COMPUTED THE (MEAN) AVERAGE COMPOSITION FOR AN IP ADDRESS RANGE. HOWEER, THIS MEANS THAT ALL UNKNOWN HOUSEHOLDS WOULD BE ASSIGNED THE SAME HOUSEHOLD DEMOGRAPHIC COMPOSITION.

AN ALTERNATE (MORE ADVANCED) APPROACH WOULD BE ASSIGN A COMPLETE HOUSEHOLD COMPOSITION BASED ON THE FREQUENCY (PROBABILITY) OF THAT COMPOSITION EXISTING WITHIN THAT RANGE. FOR EXAMPLE (USING A LARGER KNOWN DATASET THAN BEFORE); THERE IS A 1 IN 32 CHANCE THAT THE COMPOSITION BOLDED BELOW WOULD BE ASSIGNED TO THE UNKNOWN IP ADDRESS:

| | | | |
|---|---|---|---|
| 47.198.18.34 | 24 MALE | 47.198.18.45 | 30 MALE, 24 FEMALE, 1 GIRL |
| 47.198.18.186 | 25 MALE | 47.198.18.213 | 26 MALE, 29 FEMALE, 2 GIRL |
| 47.198.18.231 | 25 MALE | 47.198.18.31 | 42 MALE, 41 FEMALE, 15 GIRL |
| 47.198.18.86 | 28 MALE | 47.198.18.56 | 35 MALE, 33 FEMALE, 6 BOY, 4 GIRL |
| 47.198.18.88 | 45 MALE | 47.198.18.129 | 51 MALE, 48 FEMALE, 14 BOY, 15 GIRL |
| 47.198.18.54 | 56 MALE | 47.198.18.194 | 45 MALE, 47 FEMALE, 15 BOY, 17 GIRL |
| 47.198.18.135 | 65 MALE | 47.198.18.5 | 31 MALE, 27 FEMALE, 3 BOY, 5 BOY |
| 47.198.18.123 | 22 FEMALE | 47.198.18.39 | 38 MALE, 39 FEMALE, 12 BOY, 14 BOY |
| 47.198.18.23 | 35 FEMALE | 47.198.18.187 | 42 MALE, 41 FEMALE, 15 GIRL, 16 GIRL |
| 47.198.18.212 | 28 MALE, 27 FEMALE | 47.198.18.172 | 36 MALE, 34 FEMALE, 6 GIRL, 4 GIRL |
| 47.198.18.167 | 30 MALE, 32 FEMALE | 47.198.18.21 | 41 FEMALE, 14 BOY, 15 GIRL |
| 47.198.18.198 | 25 MALE, 25 FEMALE | 47.198.18.58 | 39 FEMALE, 16 BOY, 8 GIRL, 10 GIRL |
| 47.198.18.147 | 54 MALE, 53 FEMALE | 47.198.18.149 | 41 FEMALE, 14 BOY, 15 GIRL, 15 GIRL |
| 47.198.18.199 | 71 MALE, 68 FEMALE | 47.198.18.181 | 34 MALE, 12 BOY |
| 47.198.18.67 | 31 MALE, 29 FEMALE, 2 BOY | 47.198.18.212 | 38 MALE, 35 FEMALE, 8 BOY, 9 BOY, 12 GIRL, 13 GIRL |
| 47.198.18.12 | 26 MALE, 27 FEMALE, 4 BOY | 47.198.18.245 | 42 MALE, 37 FEMALE, 4 BOY, 6 BOY, 8 BOY, 14 GIRL |

FIG. 19

METHODS AND APPARATUS TO ASSOCIATE AUDIENCE MEMBERS WITH OVER-THE-TOP DEVICE MEDIA IMPRESSIONS

CROSS-REFERENCE TO RELATED APPLICATIONS

This patent arises from a continuation of U.S. patent application Ser. No. 15/821,507, filed Nov. 22, 2017, now issued U.S. Pat. No. 10,834,449, which claims the benefit of U.S. Provisional Application Ser. No. 62/441,238, filed on Dec. 31, 2016 and U.S. Provisional Application Ser. No. 62/455,406, filed on Feb. 6, 2017. U.S. patent application Ser. No. 15/821,507, U.S. Provisional Patent Application Ser. No. 62/441,238, and U.S. Provisional Patent Application Ser. No. 62/455,406, are hereby incorporated herein by reference in their entireties.

BACKGROUND

Audience measurement entities (AMEs) and/or other businesses often desire to link demographics to monitoring information. An AME typically establishes a panel of users who have agreed to provide their demographic information and to have their media exposure activities monitored. A panel-based approach to monitoring media content is effective with traditional viewing channels (e.g., cable Television, Broadcast Television, etc.). However, with the fragmentation of viewing platforms (e.g., streaming, internet based media, etc.), employing a panel-based approach for monitoring media may not be a cost-effective approach due to the large number of panelists that would be required to monitor accesses to the media.

BRIEF DESCRIPTION OF THE DRAWINGS

FIG. 2B shows another example linkage database system disclosed herein that may be used to implement the audience measurement system of FIG. 1.

FIG. 2C is a table illustrating example household composition information.

FIG. 9A illustrates an example process of the example OTT demographic assignment process of FIG. 8 for mapping a residential IP addresses to database proprietor cookies.

FIG. 10 illustrates an example process of the example OTT demographic assignment process of FIG. 8 for filtering out low-quality IP address-to-cookie mappings.

FIG. 14 is an overview of estimating household composition for households that do not have database proprietor household identifications.

FIGS. 15-19 provide examples of determining an estimated household composition for an unknown household based on known household compositions of households in the same IP address range as an IP address of the unknown household.

DETAILED DESCRIPTION

Figure 1:
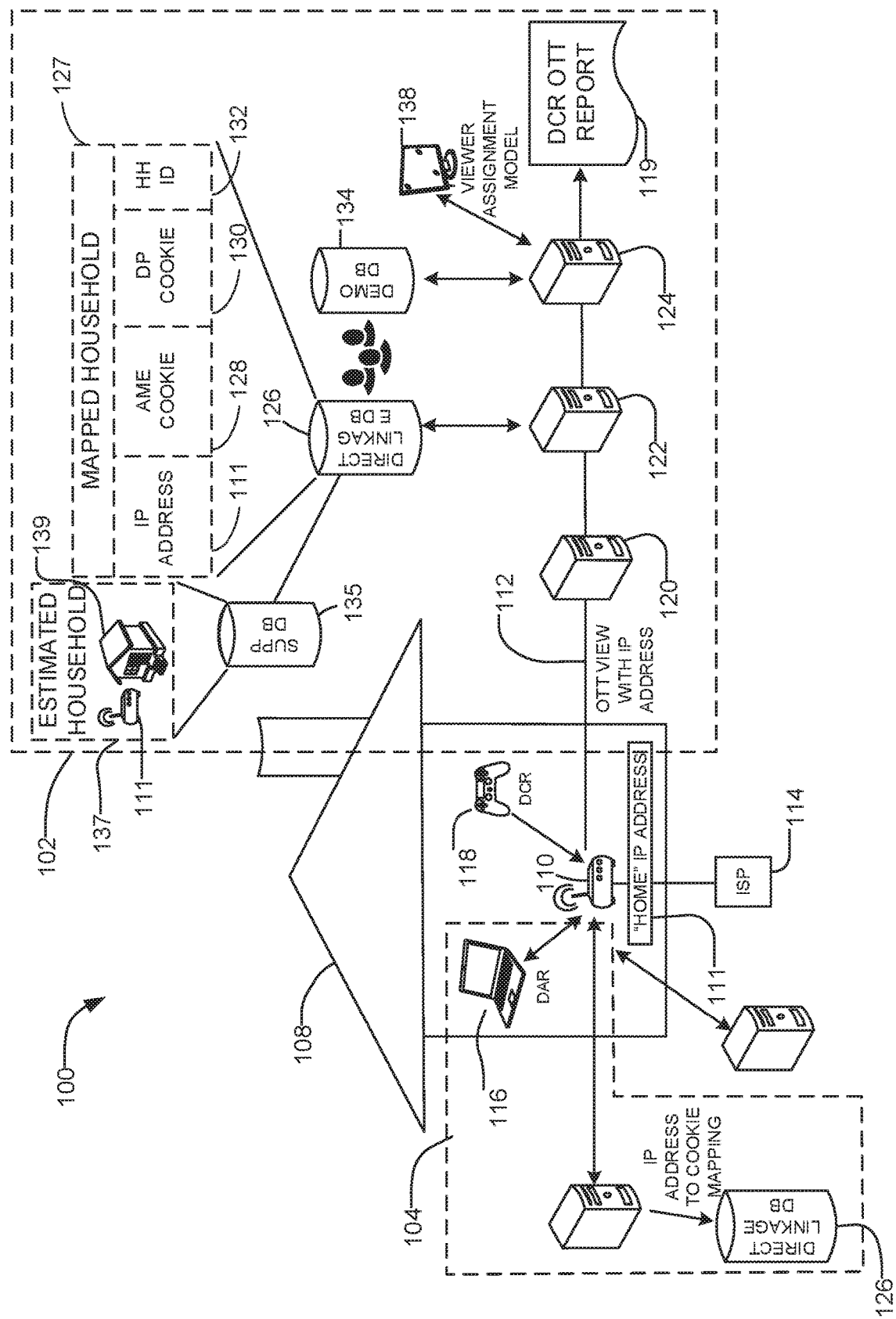
FIG. 1 illustrates an example audience measurement system constructed in accordance with the teachings of this disclosure.

Audience measurement entities (AMEs) and/or other businesses often desire to link demographics to monitoring information. Audience measurement entities (AMEs), as used herein, may include rating agencies, or entities interested in tracking media viewing impressions such as, for example, The Nielsen Company. As used herein, the term "media" includes any type of content and/or advertisement (e.g., audio and/or video (still or moving) content and/or advertisement) delivered via any type of media distribution medium or media delivery platform. Thus, media includes television programming, television advertisements, radio programming, radio advertisements, movies, web sites, streaming media, television commercials, radio commercials, Internet ads, etc. An AME typically establishes a panel of users who have agreed to provide their demographic information and to have their media exposure activities monitored.

A panel-based approach to monitoring media content is effective with traditional viewing channels (e.g., cable Television, Broadcast Television, etc.). However, with the fragmentation of viewing options (e.g., streaming, internet based media, etc.), employing a panel-based approach for monitoring media may not be a cost-effective approach due to the large number of panelists that would be required to monitor the media. For example, a relatively large panel of users may be required to monitor over-the-top media delivered over the Internet. Thus, to monitor over-the-top media, audience measurement entities typically employ a census-based approach. A census-based approach monitors media access activities regardless of whether the audience members are panelists. As such, the AME does not have collected demographics about many of the audience members corresponding to the census-based measurements. As such, although a census-based approach establishes volumetric metrics needed for over-the-top media monitoring, the census-based approach does not provide direct demographic information of viewers associated with the over-the-top media. Example methods, apparatus and articles of manufacture disclosed herein establish and/or improve demographic information when leveraging a census-based solution to monitor ratings of over-the-top media.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions (also known as a media impression request) are associated with the hypertext markup language (HTML) of the media to be tracked. When a client requests the media, both the media and the impression request are downloaded to the client. The impression requests are, thus, executed whenever the media is accessed, be it from a server or from a cache. Additional techniques to monitor Internet-based media accesses are disclosed by Mazumdar et al. in U.S. Pat. No. 8,370,489, which is hereby incorporated herein by reference in its entirety. Further, additional techniques to monitor mobile-based media and/or employing activity assignment model analyzers to generate media measurement reports is provided in U.S. patent application Ser. No. 14/569,474 (Rao et al.), which is incorporated herein by reference in its entirety.

Impression requests cause monitoring data reflecting information about an access to the media to be sent from the client that downloaded the media to a monitoring entity. Sending the monitoring data from the client to the monitoring entity is known as an impression request. Typically, the monitoring entity is an audience measurement entity (AME) that did not provide the media to the client and who is a trusted (e.g., neutral) third party for providing accurate usage statistics (e.g., The Nielsen Company, LLC). Advantageously, because the impression requests are associated with the media and executed by the client browser whenever the media is accessed, the monitoring information is provided to the AME (e.g., via an impression request) irrespective of whether the client corresponds to a panelist of the AME.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), etc. These database proprietors set cookies and/or other device/user identifiers on the client devices of their subscribers to enable the database proprietor to recognize their subscribers when they visit the database proprietor website.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors.

As used herein, an impression is defined to be an event in which a home or individual accesses and/or is exposed to media (e.g., an advertisement, content, a group of advertisements and/or a collection of content). In Internet advertising, a quantity of impressions or impression count is the total number of times media (e.g., content, an advertisement or advertisement campaign) has been accessed by a web population (e.g., the number of times the media is accessed). In some examples, an impression or media impression is logged by an impression collection entity (e.g., an AME or a database proprietor) in response to a beacon request from a user/client device that requested the media.

As used herein, a demographic impression is a media impression logged by an entity with corresponding demographic information of a household and/or audience member associated with the media impression. A panelist demographic impression is a media impression logged by an AME for which the AME has panelist demographics corresponding to a household and/or audience member exposed to media. As used herein, a database proprietor demographic impression is an impression recorded by a database proprietor in association with corresponding demographic information provided by the database proprietor in response to a beacon request from a client device of a registered subscriber of the database proprietor. In some examples, a media impression is not associated with demographics.

Unlike computers, tablets and/or other internet-based devices, OTT devices do not employ cookies. Thus, an audience measurement entity (AME) cannot employ a cookie to enable the audience measurement entity to identify an OTT device whenever the OTT device is used to access media. In examples disclosed herein, an audience measurement entity receives the IP address information from OTT devices. However, without linking the IP address information to corresponding audience members, the AME cannot determine demographic information of a viewer using the OTT device.

Example methods, apparatus and articles of manufacture disclosed herein include associating demographics to media impressions corresponding to media accessed via over-the-top (OTT) devices. For example, disclosed examples include mapping public Internet protocol (IP) addresses of households having OTT devices with household IDs of such households. The household IDs are maintained by a database proprietor in association with demographic information about those households. In this manner, an AME can associate OTT device-based impressions (e.g., OTT impressions) with corresponding demographic information based on the IP addresses received with impression requests (e.g., messages reporting occurrences of media impressions) from OTT devices and the IP address-to-household ID mapping. Example techniques that may be used to implement OTT media impression collection are disclosed in Splaine et al. (U.S. patent application Ser. No. 14/823,621), which is hereby incorporated herein by reference in its entirety.

Example methods, apparatus and articles of manufacture disclosed herein employ rich data collected by one or more database proprietors to determine demographic information for impressions of media accessed via OTT devices. For example, the methods, apparatus and articles of manufacture disclosed herein enable impression monitoring from OTT devices regardless of whether a viewer associated with media presented by the OTT device is registered as a panelist with an audience measurement entity. For example, when an OTT device transmits impressions to an impression monitoring system of an AME disclosed herein, the AME can determine demographic information relating to the viewer of the content presented by the OTT device based on an IP address associated with the OTT device (e.g., regardless of whether the viewer is registered with the audience measurement entity). Thus, an audience measurement system disclosed herein monitors impressions transmitted by an OTT device by using an IP address (e.g., a residential IP address) associated with the OTT impressions.

To enable an audience measurement entity to monitor impressions using an IP address associated with an OTT device (e.g., that is not registered with the audience measurement entity), the example methods, apparatus and articles of manufacture disclosed herein employ one or more database proprietors (e.g., Facebook, Experian, Google, etc.). More specifically, prior to monitoring an impression event, the audience measurement entity establishes (e.g., maps) a cookie and/or a household identification associated with a database proprietor to the IP address associated with an OTT device. Subsequently, during an impression monitoring phase, the audience measurement entity retrieves demographic information of a household from the database proprietor based on the previously established mapping of the database proprietor cookie and/or household identification to the IP address of the OTT device. In other words, the audience measurement entity employs example impression monitoring systems disclosed herein that associate household demographic information collected and stored by a database proprietor to establish or formulate a ratings report (e.g., a digital content ratings report) based on an IP address associated with an OTT device presenting media. In some examples, example impression monitoring systems disclosed herein may consult a census and/or panelist monitoring database maintained by the audience monitoring system to verify, correlate, analyze and/or improve demographic information obtained from the database proprietor. In some examples, example impression monitoring systems disclosed herein enable determining user-level viewership of OTT devices.

In some examples, a database proprietor may not have household demographic information (e.g., a household identification) associated with an IP address of an OTT device presenting media. Thus, in such examples, the audience measurement entity cannot directly map household demographic information to an IP address of a household. In some such examples, the audience measurement entity estimates a representative composition of a household for IP addresses of OTT devices that cannot be mapped to database proprietor household demographic information (e.g., a household identification). In some examples, the audience measurement entity establishes the estimated household composition prior to monitoring an impression event. In some such examples, the impression monitoring system of the audience measurement entity employs the estimated household composition to establish or formulate a ratings report (e.g., a digital content ratings report) based on an IP address associated with an OTT device presenting media (i.e., for an IP address that does not have database proprietor household demographic information).

FIG. 1 illustrates an example audience measurement system 100 constructed in accordance with the teachings of this disclosure. The audience measurement system 100 of the illustrated example includes an impression monitoring system 102 and a linkage database system 104 that provides information to implement the impression monitoring system 102. For example, the impression monitoring system 102 of the illustrated example can be used to determine a household member composition (e.g., demographics, number of adults, number of children, ages, genders, household income, primary spoken language (e.g., Spanish, English, etc.) of a household corresponding to an OTT impression. The linkage database system 104 of the illustrated example enables the impression monitoring system 102 to associate one or more particular household audience members of the household with the OTT impression based on the household composition.

Figure 2A:
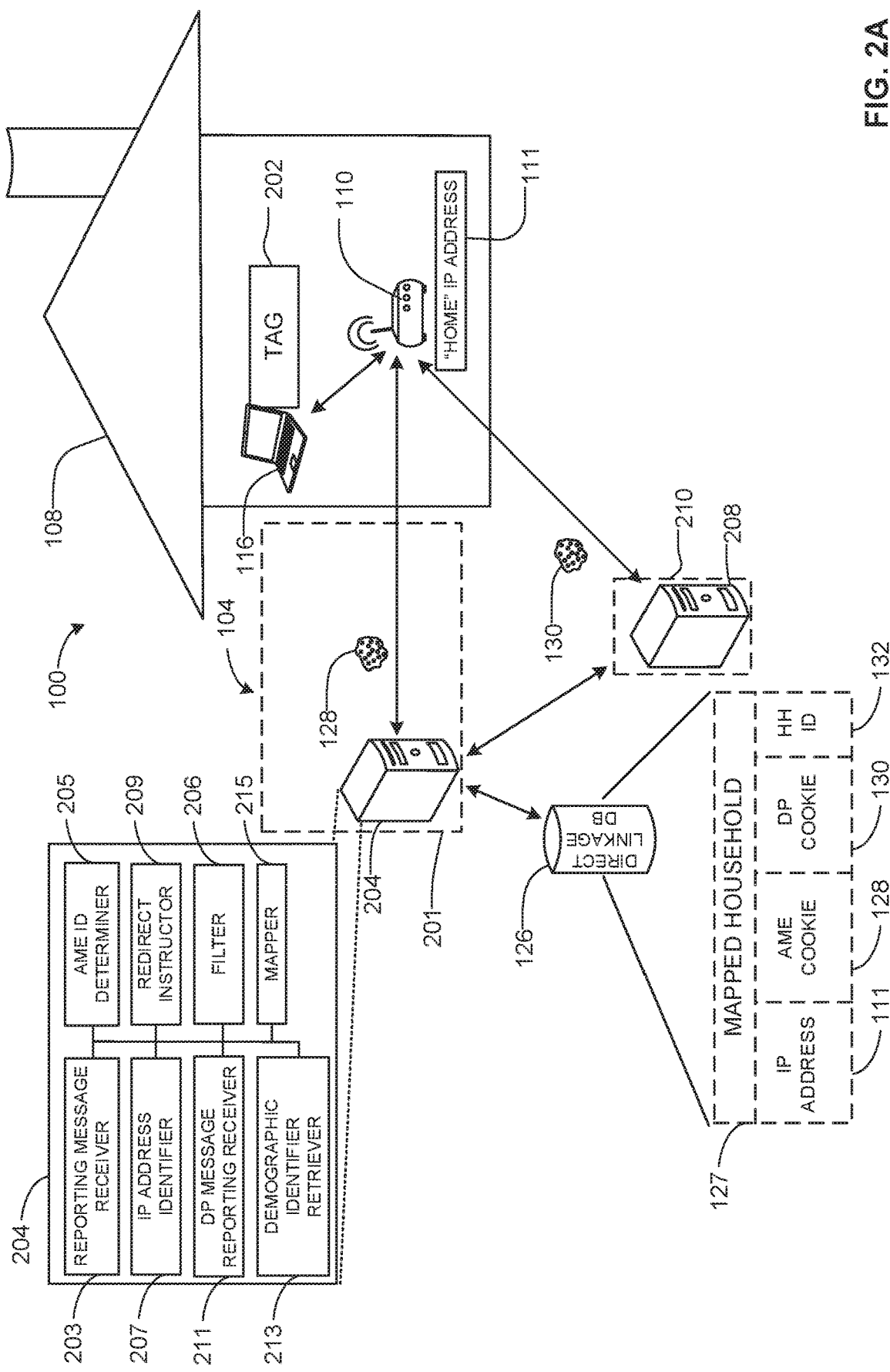
FIG. 2A shows an example linkage database system of the example audience measurement system of FIG. 1.

The example audience measurement system 100 may be employed by an audience measurement entity (AME) (e.g., the AME 201 of FIGS. 2A and 2B). For example, the impression monitoring system 102 and/or the linkage database system 104 may be implemented by the AME. The AME may be a neutral third party (such as The Nielsen Company (US), LLC) that does not source, create, and/or distribute media and can, thus, provide unbiased ratings and/or other media monitoring statistics or reports.

The audience measurement system 100 of the illustrated example may monitor media accessed at a media presentation environment 108. The media presentation environment 108 of the illustrated example of FIG. 1 is a home location or a household. In the illustrated example, the media presentation environment 108 includes a residential gateway 110 that is connected to the Internet 112 via an internet service provider (ISP) 114 (e.g., a cable internet provider, a digital subscriber line (DSL) provider, etc.)). The example residential gateway 110 of the illustrated example of FIG. 1 includes a router that enables multiple devices within the media presentation environment 108 to communicate via the Internet 112. The residential gateway 110 may host a wireless local area network (LAN) using, for example, WiFi. However, any other past, present, and/or future approach to hosting a local area network may additionally or alternatively be used.

The ISP 114 typically assigns a single public Internet Protocol (IP) address 111 (e.g., a dynamic or static IP address) per media presentation environment 108 (e.g., a household). As used herein, the public IP address 111 is assigned to the residential gateway 110 of the media presentation environment 108 by the ISP 114 and is deemed as public because it is used to uniquely identify the residential gateway 110 on the public Internet 112. The public IP address 111 is shared by client devices that are at the media presentation environment 108 and communicating via the ISP 114 in that network communications from/to the client devices are routed across the Internet 112 using the public IP address 111. As such, when an Internet connection is shared by multiple devices (e.g., via a wireless access point, via a router, etc.) those multiple devices use the same public IP address 111 to communicate over the Internet 112.

For example, within the LAN hosted by the example residential gateway 110, individual devices such as, for example, a client device 116 and/or an OTT device 118 connect to the Internet 112 via the residential gateway 110. The example client device 116 of FIG. 1 may be any device capable of accessing media over the Internet 112. For example, the client device 116 may be a computer, a tablet, a smart television, and/or any other Internet-capable device or appliance. Examples of the OTT device 118 include, for example, a video game console (e.g., Xbox®, PlayStation®), a smart television, a digital media player (e.g., a Roku® media player, a Slingbox®, Apple® T.V., etc.), and/or any other device that may stream media (e.g., video content, audio content, etc.) via the internet 112.

In some examples, the individual devices within the media presentation environment 108 may be assigned respective private Internet Protocol (IP) addresses by the residential gateway 110. In the illustrated example, the private IP addresses may be assigned using a Dynamic Host Configuration Protocol (DHCP). When a device within the LAN transmits a request (e.g., a request for media) to a resource outside the LAN (e.g., on the Internet 112), the example residential gateway 110 translates the originating private IP address of the device making the request to the public IP address 111 of the example residential gateway 110 before relaying the request outside the LAN (e.g. to the destination). Thus, when the resource outside the LAN receives the request, the resource can transmit a return response to the residential gateway 110 using the public IP address 111. On the return path, the example residential gateway 110 translates the destination IP address of the response to the private IP address of the requesting device so that the return message may be delivered to the device (e.g., the client device 116 or the OTT device 118) that made the original request. Thus, outside of the LAN, the client devices of the media presentation environment 108 that communicate via the residential gateway 110 are identified with the public IP address 111 of the residential gateway 110 for network communications on the Internet 112.

To monitor impressions (e.g., create the ratings and/or other media monitoring statistics 119) for media impressions presented by the OTT device 118, the audience measurement system 100 of the illustrated example employs the impression monitoring system 102. More specifically, the impression monitoring system 102 of the illustrated example monitors impressions of media accessed via the OTT device 118. Because OTT devices generally do not employ cookies, the impression monitoring system 102 of the illustrated example monitors for impressions of the OTT device 118 based on the IP address 111 of the residential gateway 110. Thus, the impression monitoring system 102 of the illustrated example monitors impressions by using the IP address 111 of the residential gateway 110 associated with the OTT device 118.

The impression monitoring system 102 of the illustrated example includes data collection facilities (e.g., servers). For example, the impression monitoring system 102 of the illustrated example includes an example census collector 120 (e.g., a central data collection server), an example harmonization system 122 (e.g., a harmonization operator) and an example demographic determiner 124 (e.g., a demographic classifier) that may be operated by the AME. In some examples, these data collection facilities are structured in a tiered approach with many satellite collection facilities collecting data and forwarding the same to one or more collection facilities.

In the illustrated example, the OTT device 118 transmits monitoring information or impression requests (e.g., that the residential gateway 110 relays with the IP address 111) to the census collector 120 of the example impression monitoring system 102. For example, when media is accessed via the OTT device 118, the OTT device 118 of the illustrated example sends an impression request or an impression reporting message to the census collector 120 via the residential gateway 110. The residential gateway 110 associates the IP address 111 with the impression reporting message as a source IP address when the residential gateway 110 relays the impression reporting message to the census collector 120. For example, the OTT device 118 may access media (e.g., a video game, programming, video, webpages, etc.) via the Internet 112. In the illustrated example, the OTT device 118 executes instructions to provide the impression request (e.g., a digital content ratings ping or request) to the census collector 120 of the AME when the OTT device 118 presents and/or accesses media. In some examples, an example manufacturer (e.g., Sony®, Microsoft®, etc.) of the OTT device 118 may cooperate with the AME to configure the OTT device 118 to provide the transmission request (e.g., provide impression monitoring information) to the census collector 120 of the AME (e.g., by sending a network communication to a Uniform Resource Locator (URL) address of a sever that implements the census collector 120) when the OTT device 118 accesses media via the Internet 112.

For example, the OTT device 118 of the illustrated example may have instructions that are locally stored on the OTT device 118 that, when executed by a processor of the OTT device 118, cause the OTT device 118 to send an impression reporting message to the census collector 120 via the Internet 112 when media is accessed via the Internet 112 via the OTT device 118. Thus, an example manufacturer may implement reporting functionality in the OTT device 118. For example, the OTT device 118 of the illustrated example may be implemented according to a software development kit (SDK) provided to the manufacturer of the OTT device 118 that includes instructions from the AME that are to cause the impression reporting by the OTT device 118. In such an example, the manufacturer of the OTT device 118 includes the instructions (e.g., executable code) provided as part of the SDK in the OTT device 118 to implement the impression reporting features of the example OTT device 118. However, in some examples, the example OTT device 118 is implemented to interact with a cloud application programing interface (API) hosted by an HTTP interface of the census collector 120. Using a cloud API does not require implementation of instructions provided as part of an SDK in the OTT device 118. Instead, by using the cloud API, the OTT device 118 is implemented using an HTTP stack (e.g., libraries and/or other executable code) that is already present on the OTT device 118. In yet other examples, the OTT device 118 itself is not configured to send impression reporting messages. Instead, apps executed by the OTT device 118 are configured to send impression reporting messages based on media access. In some such examples, media publishers (e.g., NBC®, CBS®, etc.) or aggregates (e.g., Hulu®, Direct TV®, etc.) could incorporate functionality of the AME-provided SDK in their apps to transmit monitoring information or impression reporting messages to the census collector 120 of the AME when the media accessed via an app executed by the OTT device 118.

In the illustrated example, data or information (e.g., including the IP address 111 of the residential gateway 110), is transmitted to the census collector 120 using a Hypertext Transfer Protocol (HTTP) request. While in the illustrated example the example HTTP message is used to convey the IP address to the census collector, any other approach to transmitting data may additionally or alternatively be used such as, for example, a file transfer protocol (FTP), HTTP Secure (HTTPS), secure sockets layer (SSL), an HTTP Get request, Asynchronous JavaScript and extensible markup language (XML) (AJAX), Simple Mail Transfer Protocol (SMTP) and/or any other network transport protocol that runs, for example, via Transmission Control Protocol/Internet Protocol (TCP/IP) User Datagram Protocol/Internet Protocol (IP/UDP) and/or any other Internet-based communication protocols. In the illustrated example, the impression reporting messages are transmitted in near real-time to the census collector 120. As used herein, near real-time is defined to be transmission of data (e.g., impression reporting messages) within a short time duration (e.g., one minute) of the identification, generation, and/or detection of the data. However, in some examples, the data may be stored (e.g., cached, buffered, etc.) for a period of time before being transmitted to the census collector 120.

Thus, the census collector 120 of the illustrated example identifies the IP address 111 of the residential gateway 110 associated with the OTT device 118 when the OTT device 118 provides impression requests. The census collector 120 of the illustrated example communicates, provides and/or otherwise sends the IP address 111 information to the harmonization system 122. The harmonization system 122 of the illustrated example is communicatively coupled to a direct linkage database 126 of the audience measurement system 100. The example direct linkage database 126 is provided or generated by the AME.

As described in greater detail below in connection with FIG. 2A, the direct linkage database 126 of the illustrated example is provided (e.g., generated, developed, compiled, etc.) during a direct linkage database build phase by the linkage database system 104. The direct linkage database 126 includes a linkage mapping record 127 having data or information that is organized and/or retrievable using the IP address 111. For example, as described in greater detail below in connection with FIG. 2A, the direct linkage database 126 includes mapping information of the IP address 111, an audience measurement entity (AME) cookie 128, a database proprietor identifier or database proprietor (DP) cookie 130 and/or a database proprietor demographic identifier or household identification (HH ID) 132. In some examples, the direct linkage database 126 of the illustrated example includes an audience measurement entity session identifier (AME session ID) associated with the AME cookie 128. Thus, based on the received IP address 111, the harmonization system 122 of the illustrated example can retrieve the AME cookie 128, the DP cookie 130 and/or the HH ID 132 that is assigned to or mapped with the IP address 111 associated with the OTT device 118. The harmonization system 122 of the illustrated example retrieves the HH ID 132 associated with the IP address 111 and communicates and/or sends, for example, the HH ID 132 to the demographic determiner 124.

The demographic determiner 124 of the impression monitoring system 102 retrieves information from a demographic database 134 that associates the HH IDs to household demographics. For example, the demographic determiner 124 of the illustrated example employs the HH ID 132 to request demographic information from the demographic database 134 associated with the HH ID (i.e., the household ID of the database proprietor). For example, the demographic database 134 may include demographic information of household members associated with the media presentation environment 108. The demographic information may include, for example, the number of household members, the age, gender, ethnicity and/or any other information of each household member. Thus, the demographic determiner 124 receives and/or imports demographic information from the demographic database 134 using the HH ID. Thus, the demographic determiner 124 of the illustrated example assigns demographic information from the demographic database 134 to the OTT impression associated with the OTT device 118. In some examples, the demographic database 134 may employ the DP cookie 130 to provide the demographic information. In the illustrated example, the demographic database 134 may be obtained from a database proprietor (e.g., the database proprietor 210 of FIGS. 2A and 2B) that collects and maintains household demographic information for a number of households in a monitored population (e.g., a country, a state, a metropolitan area, etc.).

In some examples, a database proprietor may not have household audience member composition information (e.g., demographics of household members in association with the HH ID 132) to associate with the IP address 111. In such examples, the audience measurement entity generates or establishes an estimated household composition for each IP address that does not have a respective database proprietor household identification. For example, the audience measurement entity establishes an estimated household composition 137 and assigns the estimated household composition 137 to the IP address 111 (e.g., corresponding to a household for which the database proprietor does not have database proprietor household composition information). As described in greater detail below, the audience measurement entity establishes the estimated household composition during an OTT impression monitoring event or during a build phase of the direct linkage database 126.

As described in greater detail below in connection with FIGS. 2A and 2B, the estimated household composition 137 of the illustrated example may be determined by using a range of IP addresses assigned to the same geographic area based on one or more matching characteristic(s) (e.g., the same set of first three octets of public IP addresses) and/or matching address allocation block(s) of IP addresses that are provided in the direct linkage database 126.

In some examples, the audience measurement entity of the illustrated example generates or establishes an estimated household composition of an unknown household without a database proprietor household identification during an OTT impression monitoring event. In some such instances, the harmonization system 122 of the illustrated example retrieves household identifications (HH IDs) from the direct linkage database 126 associated with corresponding IP addresses that have one or more matching characteristic(s) or allocation blocks as the IP address of the unknown household. In turn, the demographic determiner 124 of the illustrated example obtains demographic information from the demographic database 134 using the household identifications retrieved from the direct linkage database 126 that are mapped to IP addresses having matching characteristic(s) with the IP address (e.g., the IP address 111) of the unknown household. As described in greater detail below in connection with FIG. 2A, IP address matching characteristic(s) include, for example, similar octets (e.g., first three octets matching between IP addresses), same address allocation block(s), etc. Typically, IP addresses having matching characteristic(s) (e.g., same first three octets across IP addresses or same address allocation block(s)) are typically assigned to the same geographic region (e.g., a neighborhood, a town, an apartment block, etc.). Thus, in some examples, the estimated household composition 137 that is determined from known household identifications associated with the IP addresses in the direct linkage database 126 that have matching or similar IP address characteristic(s) as the IP address of an unknown household is based on audience members in households for which the database proprietor has known household identifications and for which IP addresses are assigned in the same geographic region (e.g., a neighborhood, a town, etc.) as the unknown household without a household identification. In some examples, the estimated household composition 137 may be an average or mean composition of audience members across multiple known households for which the database proprietor has known household identifications and for which IP addresses are assigned in the same geographic region as the unknown household without a household identification. In some examples, the estimated household composition 137 is randomly selected from a plurality of household compositions for which IP addresses are assigned in the same geographic region (e.g., a neighborhood, a town, etc.) as the household without a household identification.

In the illustrated example of FIG. 1, the estimated household composition 137 is stored in a supplemental household composition database 135 for use with OTT impression monitoring events performed by the harmonization system 122. Specifically, the supplemental household composition database 135 of the illustrated example includes an IP address-to-estimated household composition mapping 139. In examples disclosed herein, the estimated household composition 137 may be determined in advance of monitoring impressions such as during the direct linkage database build phase. In other examples, the estimated household composition 137 is determined during an OTT impression monitoring phase.

For examples, in which the estimated household composition 137 is not generated in advance during the direct linkage database build phase, the estimated household composition 137 is generated dynamically during the OTT impression monitoring phase and stored for subsequent use in the supplemental household composition database 135. In such examples, the harmonization system 122 may use the supplemental household composition database 135 to determine if an estimated household composition has already been established or created for an IP address of an unknown household for which an impression is being logged by the impression monitoring system 102. If the harmonization system 122 determines during an impression collection event that an estimated household composition 137 has been generated for an IP address of an unknown household, the demographic determiner 124 of the illustrated example retrieves the estimated household composition 137 from the supplemental household composition database 135.

As described in greater detail below in connection with FIG. 2B, for examples in which the supplemental household composition database 135 is populated with the estimated household composition 137 during the direct linkage database build phase, the supplemental household composition database 135 may be built in parallel with the direct linkage database 126. For example, an estimated household composition 137 may be determined during the direct linkage database build phase for IP addresses of geographic regions that have a significant population (e.g., over one million residents).

The demographic determiner 124 of the illustrated example includes a model analyzer 138 (e.g., a viewer assignment model (VAM)) to generate the media monitoring statistics 119 (e.g., a digital content ratings (DCR) report, a digital advertisement ratings (DAR) report, a digital television ratings (DTVR) report, etc.) for media presented by the OTT device 118. For example, the demographic determiner 124 uses the demographic information (e.g., via the model analyzer 138) from the demographic database or the supplemental household composition database 135 to establish or determine demographic information of a viewer(s) associated with the OTT device 118. In some examples, the demographic determiner 124 of the illustrated example determines or obtains household information from the demographic database 134 or determines or obtains household information from the supplemental household composition database 135. Thus, in some examples, the demographic determiner 124 of the illustrated example generates the media monitoring statistics 119 based on the demographic information provided by the demographic database 134 (e.g., of a database proprietor) and/or the estimated demographic information provided by the supplemental household composition database 135.

In some examples, the media presentation environment 108 may include more than one household member. To determine which household member is viewing the media presented by the OTT device 118 and/or to verify and/or enhance the media monitoring statistics 119 (e.g., enhance demographic viewership results), the demographic determiner 124 of the illustrated example may use demographic information of panelists registered with the AME in combination with the demographic information provided by the demographic database 134.

For example, the AME establishes a panel of users who have agreed to provide their demographic information and to have their media exposure activities monitored. When a household joins the panel, it provides detailed information concerning household member composition, identities, and demographics (e.g., genders, ages, ethnicity, income, home location, occupations, etc.) to the AME. For example, the demographic determiner 124 of the illustrated example may retrieve registered panelist information from a central facility (e.g., a panelist server) of the AME. In some examples, the census collector 120, for example, may include demographic information of panelists registered with the AME (e.g., associated with the AME cookie 128).

Typically, the OTT device 118 is not associated or identified (e.g., registered) to a panelist registered with the AME. Thus, the demographic determiner 124 may compare the demographic information obtained from the demographic database 134 with AME panel household demographic information obtained from the central facility of the AME to identify a similar AME household (e.g., a similar household composition) as the household demographics provided by the demographic database 134. For example, household information (e.g., of its members) provided by the demographic database 134 may be compared with panelist households identified by the AME to find AME panel households that are similar to (e.g., match) the demographics (e.g., number of members, age, gender, etc.) of the household composition provided by the demographic database 134.

In this manner, the demographic determiner 124 of the illustrated example may employ factors associated with registered household panelists of the AME to predict which member(s) of the household associated with the household of the demographic database 134 viewed the media presented by the OTT device 118 (e.g., when more than one person is associated with the media presentation environment 108). For example, using factors such as time of day, content genre, employing the viewing behavior of the audience measurement entity household panelists, etc., may be employed to predict which household member(s) identified in the database proprietor information viewed the media presented by the OTT device 118. In some examples, the demographic determiner 124 may employ a score system to improve the accuracy of the media monitoring statistics 119. An example method of employing an activity assignment model analyzer is provided in U.S. patent application Ser. No. 14/569,474 (Rao et al.), which is incorporated herein by reference in its entirety.

FIG. 2A shows an example linkage database system 104 that may be used to implement the audience measurement system 100 of FIG. 1. FIG. 2A shows the example linkage database system 104 of FIG. 1 that is implemented using a synchronization/exchange process (e.g., a cookie synchronization/exchange process) between an AME server 204 of an AME 201 and a database proprietor 210. The AME server 204 of the illustrated example includes an example reporting message receiver 203, an example AME ID determiner 205, an example IP address identifier 207, an example redirect instructor 209, an example database proprietor (DP) message reporting receiver 211, an example filter 206, an example demographic identifier retriever 213 (e.g., HH ID 132 retriever), and an example mapper 215.

As noted above, the linkage database system 104 of the illustrated example associates or maps the DP cookie 130 and/or the HH ID 132 associated with a database proprietor 210 with the IP address 111 of the residential gateway 110 of the media presentation environment 108 during a linkage database build phase. For example, the protocols of the Internet 112 (FIG. 1) make cookies inaccessible outside of the domain (e.g., Internet domain, domain name, etc.) on which they were set. Thus, a cookie set, for example, in the client device 116 by the database proprietor 210 is accessible to servers in the domain of the database proprietor 210, but not to servers outside that domain such as servers (e.g., the census collector 120) in the domain of the AME 201. However, the AME 201 can employ the example linkage database system 104 disclosed herein to access information associated with the DP cookies 130 and/or the HH ID 132 of the database proprietor 210, which the AME 201 would otherwise be unable to access.

Although examples disclosed herein are described as employing cookies such as the AME cookie 128 and the DP cookie 130, other types of example identifiers instead of or in addition to cookies may be used as client device identifiers. Examples of other types of identifiers include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., an "Identifier for Advertising" (IDFA), advertising service identifiers, device usage analytics service identifiers, demographics collection service identifiers), web storage data, document object model (DOM) storage data, local shared objects (also referred to as "Flash cookies"), etc.

Referring to FIG. 2A, to associate or map the IP address 111 with DP cookie 130 and/or the HH ID 132, the linkage database system 104 of the illustrated example builds, formulates or compiles the direct linkage database 126 for use by the impression monitoring system 102 when monitoring impressions of the OTT device 118 (FIG. 1) during an impression monitoring phase. As noted above, the linkage database system 104 of the illustrated example compiles or maps a profile (e.g., the linkage mapping record 127) in the direct linkage database 126 with information including, for example, the IP address 111 of the residential gateway 110, the AME cookie 128, the DP cookie 130, the HH ID 132 and/or the AME session ID.

To map or associate a cookie (e.g., the DP cookie 130) of a database proprietor 210 to the IP address 111 of the residential gateway 110, the linkage database system 104 of the illustrated example initiates a direct linkage mapping process 400 described in connection with FIG. 2A. Initially, a browser of the client device 116 accesses a web page including an example tag 202 (e.g., beacon instructions). The web page may be a webpage that is not associated with the AME. For example, the web page may include information (e.g., an image or advertisement) included in the web page downloaded via the client device 116. In the illustrated example, the browser of the example client device 116 of FIG. 1 executes the beacon instructions in the tag 202 and sends a cookie reporting message through the residential gateway 110 to the example AME 201 based on the beacon instructions. In the illustrated example, the cookie reporting message is transmitted from the client device 116 to the AME server 204 of the AME 201 using a Hypertext Transfer Protocol (HTTP) request. Because the HTTP protocol is used, the impression request includes the AME cookie 128 that identifies a user and/or the client device 116 and the IP address 111 of the residential gateway 110 that is relaying the HTTP request to the AME server 204. For example, the reporting message receiver 203 of the AME server 204 of the illustrated example receives the cookie reporting message from the client device 116. The AME ID determiner 205 of the illustrated example identifies an AME cookie ID of the AME cookie 128 associated with the cookie reporting message. Additionally, the IP address identifier 207 of the illustrated example identifies the IP address (e.g., the public IP address 111) associated with the cookie reporting message initiated by the beacon instructions. In some examples, the AME server 204 is implemented by the census collector 120 of FIG. 1.

When the reporting message receiver 203 of the AME server 204 of the AME 201 receives the cookie reporting message from the client device 116, the mapper 215 of the AME server 204 maps the AME cookie ID of the AME cookie 128 to the IP address 111 by storing the AME cookie ID together with the IP address 111 in the linkage mapping record 127 of the direct linkage database 126. The redirect instructor 209 of the AME server 204 then sends a response or instruction (e.g., a redirect instruction) to the client device 116 in the form of a redirect response or instruction (e.g., an HTTP 302 redirect) to cause the client device 116 to send a second cookie reporting message to the database proprietor 210. In the illustrated example, the second cookie reporting message includes the DP cookie 130 and the IP address 111.

When a database proprietor (DP) server 208 of the database proprietor 210 receives the second cookie reporting message, the DP server 208 retrieves the DP cookie 130 and the IP address 111 from the second cookie reporting message, and returns a redirect response to the client device 116 to cause the client device 116 to send a third cookie reporting message to the AME 201. For example, the DP message reporting receiver 211 receives the third cookie reporting message from the DP server 208. In the illustrated example, the DP server 208 adds a DP cookie ID of the DP cookie 130 to the URL query string of the redirect response. In this manner, the client device 116 can send the DP cookie ID of the DP cookie 130 to the AME 201 in the third cookie reporting message. When the AME server 204 of the AME 201 receives the third cookie reporting message from the client device 116, the AME server 204 collects the DP cookie ID (e.g., via the DP message reporting receiver 211) from the third cookie reporting message and maps (e.g., via the mapper 215) the DP cookie ID by storing the IP address 111, the AME cookie ID, an AME session ID, and the DP cookie ID in the linkage mapping record 127.

To improve accuracy and/or quality of the information in the direct linkage database 126 (e.g., the quality of the IP address 111-to- HH ID 132 mapping) and/or to reduce costs and/or limit a number of impression requests (e.g., pings) used to build the direct linkage database 126, the linkage database system 104 of the illustrated example filters or leverages tagged media that is flagged as database proprietor enabled media (e.g., media enabled for tracking by a database proprietor such as Experian). Thus, in some examples, the linkage database system 104 uses only database proprietor tag-enabled media to build the direct linkage database 126. Such filtering or leveraging of database proprietor flagged media may improve the accuracy and/or quality of the information in the direct linkage database 126 (e.g., the quality of the IP address 111- to- HH ID 132 mapping).

To filter or leverage database proprietor flagged campaigns to improve the quality of mapping of the IP address 111 with the AME cookie 128 of the AME 201 and/or the DP cookie 130 and/or the HH ID 132, the linkage database system 104 of the illustrated example may employs the filter 206. The filter 206 of the illustrated example may be employed to filter low-quality mapping (IP address-to-cookie) using filter criteria or rules (e.g., filter criteria or rules 1000 shown in FIG. 10). For example, the filter 206 of the illustrated example may filter AME cookies 128 or cookies from the AME 201 that may not be flagged for database proprietor enabled campaigns. Such filtering reduces risk of associating IP addresses with incorrect cookies of the AME 201.

For example, the filter 206 of the linkage database system 104 may be used to ignore certain identifiers that may lead to inaccurate mapping between the IP address 111, the AME cookie 128, the DP cookie 130 and/or the HH ID 132. For example, the filter 206 of the illustrated example may ignore certain cookies from the AME server 204 and/or the DP server 208. In some examples, the filter 206 is not employed and identifiers are used without filtering.

In some examples, the linkage database system 104 of the illustrated example may ignore identifiers and/or impression requests (e.g., DAR pings or cookie reporting messages) associated with an AME cookie that is not sufficiently old (e.g., an AME cookie that was set by the AME 201 within less than a certain time period (e.g., less than 48 hours)).

In some examples, the linkage database system 104 of the illustrated example may ignore mobile identifiers and/or mobile impression requests (e.g., impressions logged for media accessed via mobile devices and tracked using for example mobile digital ad rating (mDAR) technologies, mobile digital content technologies, etc. to receive mobile impression reporting messages) associated with mobile web browsers or mobile apps of mobile devices (e.g., which may otherwise provide unreliable residential IP addresses because impression reporting messages are sent by mobile devices from outside a corresponding household and/or via a cellular network (instead of via a residential gateway). For example, the linkage database system 104 of the illustrated example may ignore or filter mobile impressions associated with mobile web browsers or mobile apps of mobile devices that may be used within the media presentation environment 108 to access media via the network and/or the Internet 112 or a cellular network. In some examples, the linkage database system 104 of the illustrated example may ignore identifiers and/or cookie reporting messages (e.g., mDAR pings) received from users of mobile web browsers.

In some examples, the linkage database system 104 of the illustrated example may ignore identifiers and/or impression requests (e.g., cookie reporting messages) from known business locations (e.g., U.S. businesses) and/or cellular or international IP addresses. Such analysis may be performed using a NetAcuity service or any other geolocation service(s) or entity. For example, NetAcuity is an IP address-to-geolocation third-party service. In some examples, the linkage database system 104 of the illustrated example may ignore identifiers and/or impression requests (e.g., cookie reporting messages) from suspected autonomous devices (e.g., robots, auto-generated web pages, etc.).

In some examples, the linkage database system 104 of the illustrated example may ignore identifiers and/or impression requests (e.g., cookie reporting messages) from suspected or known non-residential IP addresses (e.g., determined by a number of unique cookies established by the audience measurement entity). Non-residential IP addresses include, for example, IP addresses of known businesses (e.g., Starbucks®, neighborhoods using IPv4 NATS, stadiums, etc.). In some examples, the linkage database system 104 of the illustrated example may ignore identifiers and/or requests (e.g., pings) collected or received during normal business hours. For example, the linkage database system 104 of the illustrated example may ignore identifiers and/or requests (e.g., pings) received during normal business hours of a Designated Market Area (DMA) determined via, for example, Netacuity. Normal business hours may be between, for example, 9 a.m. and 5 p.m. of the local time zone associated with the DMA. A DMA is a geographical region where a population can receive the same (or similar) media offerings.

In some examples, the linkage database system 104 of the illustrated example may ignore identifiers and/or impression requests (e.g., cookie reporting messages) having AME cookies that have multiple or different IP addresses and/or pings from secondary IP addresses. In some examples, the linkage database system 104 of the illustrated example may ignore identifiers and/or impression requests (e.g., cookie reporting messages) having AME cookies that have less than a threshold number of pings (e.g., 100 pings). In some such examples, the filter 206 may ignore AME cookies corresponding to less than a threshold number of pings (e.g., 100 pings) after applying one or more of the example foregoing filter parameters. In this manner, the linkage database system 104 of the illustrated example may ignore IP addresses generated by a dynamic host configuration protocol (DHCP) to eliminate households with frequent IP address turnover or changes. The foregoing filter criteria are non-exhaustive and other filter criteria may be employed by the linkage database system 104 to increase the accuracy of mappings of IP addresses, AME cookies, and DP cookies. In some examples, the AME server 204 maps the IP address 111, the AME cookie 128 and the DP cookie 130. In some examples, the AME server 204 of the illustrated example may map the IP address 111, the AME cookie 128, the DP cookie 130 and the HH ID 132.

Figure 11:
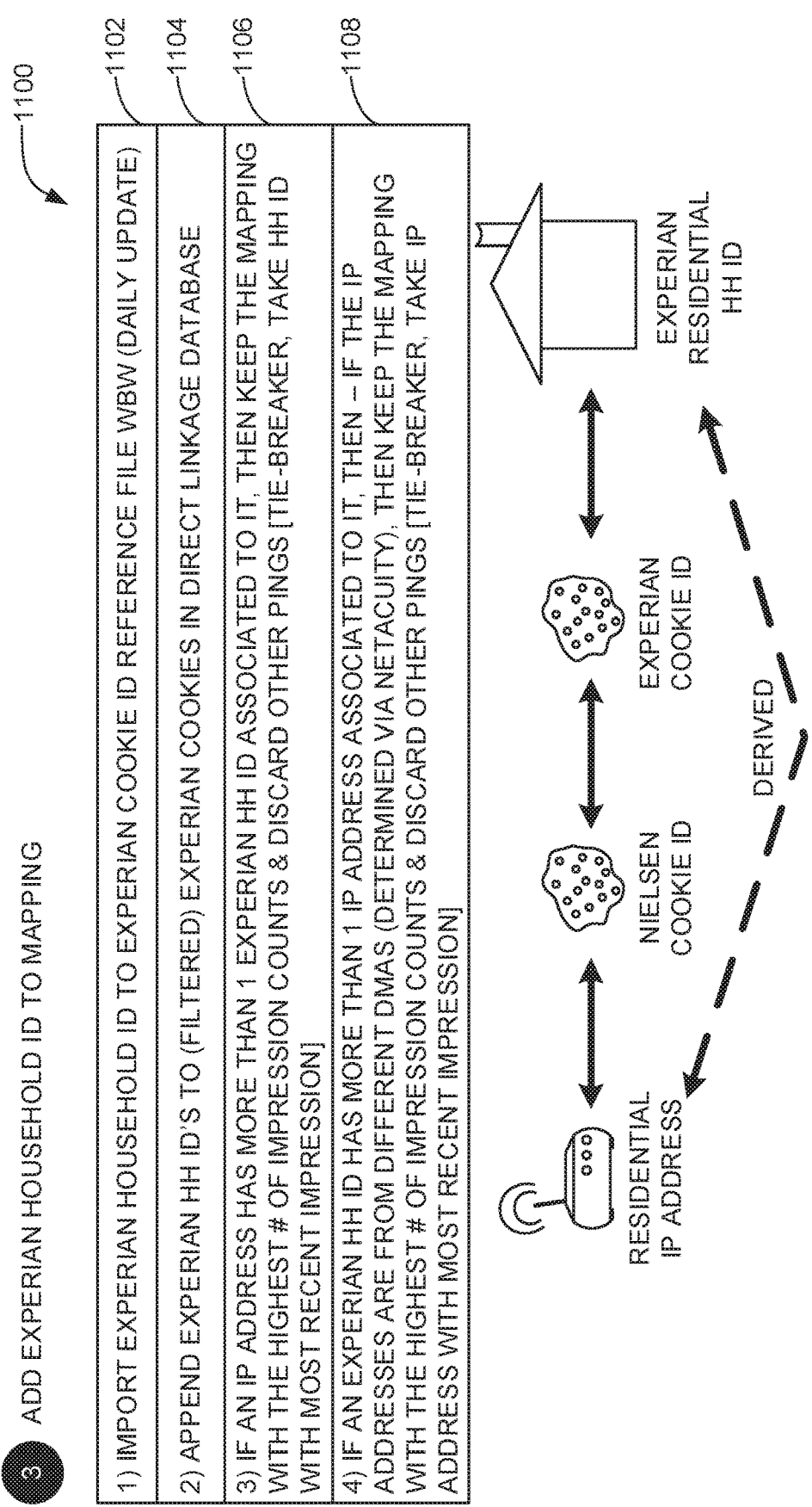
FIG. 11 illustrates an example process of the example OTT demographic assignment process of FIG. 8 for mapping a database proprietor household ID to a corresponding IP address.

With reference now to an example DP household ID mapping process 1100 of FIG. 11, after the DP cookie 130 is obtained (e.g., based on the foregoing filtered criteria and/or filtered AME cookie 128), the demographic identifier retriever 213 and/or the AME server 204 uses the DP cookie 130 to identify and import the HH ID 132 associated with the DP cookie 130 from the DP server 208 (block 1102). In the illustrated example, the DP server 208 maintains a database that maps HH IDs to DP cookies for subscribers of the database proprietor 210 and/or for households monitored by the database proprietor 210. The DP server 208 uses such database to provide HH IDs to the AME 201 for DP cookies that survive the filtering process described above. The AME server 204 may map DP cookies with respective ones of the database household identifiers (HH IDs) periodically (e.g., on an hourly, daily, weekly, monthly basis or any other frequency) or aperiodically (e.g., randomly or when a criterion is met). In this manner, the AME 201 leverages this mapping after the filtering process to associate HH IDs to corresponding ones of the DP cookie IDs that survive the filtering process. Once the HH ID 132 is determined to be associated with the (filtered) DP cookie 130, the HH ID 132 is appended to the (filtered) DP cookie 130 and stored in the direct linkage database 126 by the mapper 215 and/or the AME server 204 (block 1104).

The AME server 204 of the illustrated example of FIG. 2A may implement corrections for IP address-to-DP cookie mappings found to be associated with more than one HH ID (block 1106). For example, when ISPs assign dynamic public IP addresses to residential gateways of households using DHCP, such DHCP process may release and renew assigned public IP addresses from time to time which changes the public IP addresses of the households. In some instances, such releasing and renewing of public IP addresses results in assigning the same IP address to multiple households at different times within a particular duration (e.g., three households may be assigned the same IP addresses at different times within a 24-hour period). If the AME server 204 detects that the IP address 111 has more than one household identification (e.g., HH IDs) associated with it, then the AME server 204 retains the household identification (HH ID) with the greatest number of impression counts for the IP address-to-DP cookie mapping. The AME server 204 may discard other HH IDs having lower numbers of impression counts. In some examples, if more than one HH ID includes the same number of greatest impression counts, the AME server 204 assigns the HH ID (e.g., the HH ID 132) with the most recent impression to the IP address-to-DP cookie mapping.

Also in the illustrated example of FIG. 11, the AME server 204 of the illustrated example of FIG. 2A may implement corrections for HH IDs found to be associated with more than one IP address (block 1108). If an HH ID has more than one IP address associated to it, the AME server 204 determines if the IP addresses are from different DMAs (e.g., determined by Netacuity). For example, the AME server 204 may map the IP address with the DMA associated with a geographic location in which the media presentation environment 108 is located. In this manner, for a particular HH ID, the AME server 204 of the illustrated example retains the IP address-to-DP cookie mapping with the highest number of impression counts and may discard the other IP address-to-DP cookie mappings (corresponding to the same HH ID) having fewer requests. If multiple IP address-to-DP cookie mappings have the same number of greatest impression counts, the AME server 204 retains the IP address-to-DP cookie mapping with the most recent impression (i.e., in time) for mapping to the HH ID.

As noted above, in some examples, the database proprietor 210 may not have a household identification (e.g., a HHID) of a household to which the IP address 111 is assigned by the ISP 114. In some such examples, the AME 201 and/or the demographic determiner 124 estimates the household composition 137 (e.g., demographics) of the household 108 when the IP address 111 of the OTT device 118 cannot be mapped to a household identification (e.g., the HH ID 132) of the database proprietor 210. As noted above, the AME 201 and/or the demographic determiner 124 establish the estimated household composition 137 during an OTT impression event as shown, for example, in FIGS. 1 and 2A and/or the AME 201 and/or during the build phase of the direct linkage database 126 as shown, for example, in FIG. 2B.

To determine an estimated household composition (e.g., the estimated household composition 137) of an unknown household (e.g., the household 108) for which the AME 201 cannot map an IP address (e.g., the IP address 111) to a household identification (e.g., the HH ID 132) of the database proprietor 210, a demographic estimator (e.g., a demographic estimator of FIG. 2B) of the AME 201 or the harmonization system 122 of the illustrated example retrieves known household composition information (e.g., demographics such as, for example, age, gender, household income, primary spoken language (e.g., Spanish, English, etc.) of households corresponding to known database proprietor household identifications (e.g., HHIDs) by using the IP address-to-household identification mapping provided by the linkage mapping record 127 and the demographic database 134. For example, the AME 201 or the demographic determiner 124 establishes an estimated household composition (e.g., demographics) of an unknown household (i.e., an unknown household for which the database proprietor 210 does not have a database proprietor household identification) by using one or more household compositions (e.g., demographics) associated with known database proprietor household identifications in the IP address-to-household identification mapping of the linkage mapping record 127.

To determine selection of household compositions associated with known household identifications (HH IDs), the AME 201 leverages known household compositions of known households that are in a same geographic region (e.g., a neighborhood, a town, an apartment block, etc.) as the unknown household. In examples disclosed herein, the AME 201 identifies such similarly located homes based on blocks of similar public IP addresses assigned by the ISP 114 to households in a same geographic region. For example, the AME 201 or the harmonization system 122 of the illustrated example identifies or compares a characteristic(s) of the IP address 111 (e.g., of the unknown household for which the database proprietor 210 does not have a household identification) to a characteristic(s) of respective ones of the IP addresses in the IP address-to-household identification mapping of the linkage mapping record 127 (e.g., household identifications associated with or mapped to respective IP addresses). More specifically, the AME 201 or the harmonization system 122 of the illustrated example identifies the IP addresses in the IP address-to-household identification mapping of the linkage mapping record 127 that have similar (e.g., matching) IP address characteristic(s) to the IP address 111 corresponding to the unknown household.

In IPV4 examples, an IP address is composed of four octets (e.g., four separate numbers), where each octet can be any value between zero (0) and 255 and the octets are separated by periods (e.g., xxx.xxx.xxx.xxx). In IPv6 examples, an IP address is composed of address allocation blocks. For example, address allocation blocks of an IPv6 address include eight groups of four hexadecimal digits (e.g., each group represents two octets), where each group is separated by a colon. An example of an IPv6 address is 2001:0db8:85a3:0000:0000:8a2e:0370:7334. In IPv6 address examples, matching characteristics of IPv6 addresses may include first three groups, four groups, five groups, six groups or seven groups that match across addresses.

To optimize network administration and utilization, IP addresses are often allocated to Internet Service Providers (e.g., the ISP 114 of FIG. 1) by a regional internet registry (RIR) (e.g., American Registry for Internet Numbers (ARIN), Latin America and Caribbean Network Information Centre (LACNIC), Reseaux IP Europeens Network Coordination Centre (RIPE NCC), African Network Information Center (AFRINIC) and Asia-Pacific Network Centre (APNIC)) in blocks of contiguous IP addresses or ranges. In some instances, an ISP (e.g., the ISP 114 of FIG. 1) assigns IP addresses with the same first three octets (e.g., IP addresses xxx.xxx.xxx.zzz in the range xxx.xxx.xxx.0 to xxx.xxx.xxx.255; or IPv6 address allocation blocks) to households (e.g., the media presentation environment 108) located in the same geographic region (e.g., the same neighborhood, city, apartment block, etc.). For example, a first household in a first city may be assigned a first IP address having the same first three octets as a second IP address assigned to a second household in the same first city. Thus, the first three octets of the first IP address and the first three octets of the second IP address are a characteristic that can be leveraged by the AME 201 to identify households in a same geographic region that can be used to estimate the household composition of an unknown household (e.g., the media presentation environment 108). For example, a geographic region may be composed of households having similar household compositions (e.g., similar demographics such as age, gender, children, ethnicity, etc.). Thus, in some examples, the AME 201 leverages IP address assignment strategies of internet service providers to estimate demographics of unknown households having IP addresses that do not have existing database proprietor household identifications (e.g., HH ID 132). IP address assignment strategies can be verified or determined using an IP address to geolocation lookup tool such as, for example, www.geoiptool.com. For example, entering an IP address in a range 47.198.12.1 to 47.198.12.255 generates a zip code of 33602 and latitude 27.9578 by longitude 82.4622.

Table 1 of FIG. 2C illustrates example household composition information obtained or retrieved from the database proprietor 210 based on known household identifications (e.g., HH IDs) that have been mapped to IP addresses in the IP address-to-household identification mapping of the linkage mapping record 127 of the direct linkage database 126. For example, the AME 201 or the harmonization system 122 of the illustrated example employs the household identifications (HH IDs) associated with respective ones of the IP addresses shown in the first column of Table 1 to obtain corresponding household composition information (e.g., age and gender information) from the database proprietor 210 shown in the subsequent columns (e.g., columns 2-15).

Still referring to Table 1 of FIG. 2C, to select household composition information for determining the estimated household composition 137, the AME 201 or the harmonization system 122 of the illustrated example compares or analyzes the IP address 111 of an unknown household (e.g., the media presentation environment 108) to one or more characteristic(s) of the IP addresses shown in Table 1 that have been mapped to database proprietor household identifications in the IP address-to-household identification mapping of the linkage mapping record 127. For example, the AME 201 or the harmonization system 122 may compare the first three octets of the IP address 111 to the first three octets of other IP addresses shown in Table 1. For example, the AME 201 or the demographic determiner 124 retrieves household composition information (e.g., demographics) from the demographic database 134 and/or the DP server 208 for IP addresses in table 1 that have the same IP address characteristic(s) (e.g., the first three octets) as the characteristic(s) (e.g., the first three octets) of the IP address 111.

For example, if the IP address 111 of the illustrated example is 47.198.12.75, the AME 201 or the harmonization system 122 employs the first three octets (i.e., 47.198.12) of the IP address 111 to determine the estimated household composition 137 of the media presentation environment 108. More specifically, the AME 201 of the illustrated example identifies the IP addresses (e.g., in the IP address-to-household identification mapping of the linkage mapping record 127) that have the same (e.g., identical) first three octets (i.e., 47.198.12). In the illustrated example, table 1 includes six (6) IP addresses having the same first three octets, which are identified in a box having a dashed line in table 1.

In some examples, to determine the estimated household composition 137, the AME 201 or the demographic determiner 124 of the illustrated example determines (e.g., computes) a mean composition of a household based on the household composition information of known household identified as described above. For example, the AME 201 or the demographic determiner 124 of the illustrated example estimates the household composition of the media presentation device 108 by computing an average or mean composition of the demographics (e.g., number of persons, ages and genders) corresponding to the known households as described below in connection with Equation 1 below. For example, the AME 201 or the demographic determiner 124 of the illustrated example employs household composition information associated with the IP addresses having the first three octets of 47.198.12. In some examples, the AME 201 or the demographic determiner 124 employs rounding technique(s) if the average or mean of a particular demographic is not a whole number. For example, if the mean value is number that includes a decimal that is equal to or greater than 0.5, the AME 201 or the demographic determiner 124 of the illustrated example converts the mean value to the nearest higher whole number. If the mean value is a number that includes a decimal that is less than 0.5, the AME 201 or the demographic determiner 124 of the illustrated example converts the mean value to the nearest lower whole number.

Based on the household composition information associated with the selected IP addresses in Table 1 of FIG. 2C, an estimated household composition of the illustrated example for IP addresses having unknown database proprietor household identifications and are within an IP address range of 47.198.12.0-47.198.12.255 includes:

1 male age of 43, 1 female age of 30; 1 boy age of 14; and no girls.

For example, the estimated demographic information (e.g., age, gender, adult/child classification, etc.) can be determined by using an averaging equation such as, for example, equation 1 below.

$$\text{mean} = \frac{\sum_{i=1}^{i=n} X_i}{n} \qquad \text{Equation 1}$$

Where $X_i$ represents ages, number of persons or genders; and n is a total number samples (e.g., households) used to determine the summation of the values represented by $X_i$ to $X_n$.

For example, using Equation 1 above, the ages, number of persons and gender demographics of the illustrated example can be estimated as follows:

Gender:
   Mean Adult Male:

$$\frac{1+1+2+4+1 \text{ males}}{6 \text{ households}} = 8 \text{ males}/6 \text{ households} = 1.25$$

Males, which is rounded down to 1 Male per unknown household.

Mean Adult Female:

$$\frac{1+1+1+1+1 \text{ females}}{6 \text{ households}} = 5 \text{ females/6 households} = 0.8$$

Females, which is rounded up to 1 Female per unknown household.

Mean Child Male:

$$\frac{1+4+1}{6 \text{ households}} = 6 \text{ boys/6 households} = 1.0 \text{ Boy per unknown household}$$

Mean Child Female:

$$\frac{1+1}{6 \text{ households}} = 2 \text{ girls/6 households} = 0.3 \text{ Girls,}$$

which is rounded down to 0 girls per unknown household.

Age:

$$\text{Male Mean Age} = \frac{45+28+54+20+20+21+22+35}{8} =$$

43 years old per unknown household

Female Mean Age =

$$\frac{48+28+21+24+35}{5} = 30 \text{ years hold per unknown household}$$

Boy Mean Age =

$$\frac{15+10+13+15+17}{5} = 14 \text{ years old per unknown household.}$$

Thus, the estimated household composition for IP addresses within the IP address range of 47.198.12.0 to 47.198.12.255 that do not have a database proprietor household identification is: 1 male age 43, 1 female age 30, and 1 boy age 14. In other words, unknown households with an IP address range corresponding to a same geographic area as known households are assigned the same estimated household composition (e.g., demographics) determined for the specific IP address range having the same identified characteristic(s) (e.g., the same first three octets). The AME 201 or the harmonization system 122 stores the estimated household composition in the supplemental household composition database 135 for use by the impression monitoring system 102 of FIG. 1 when monitoring OTT impressions.

Alternatively, instead of using an average or mean computation, the AME 201 or the demographic determiner 124 of the illustrated example assigns (e.g., randomly assigns) a household composition of a known database proprietor household identification from an IP address range of a geographic area to an unknown household that is within the same IP address range of the geographic area.

For example, referring to Table 1, if the IP address 111 of the household 108 of the example of FIG. 2A is 47.198.18.1, a household composition associated with a known household identification in the IP address range of 47.198.18 (e.g., the same first three octets) may be assigned or selected as the estimated household composition 137 (e.g., a representative household composition) of the unknown household. In the illustrated example shown in Table 1, the household composition associated with the IP address 47.198.18.194 is selected (e.g., randomly) as the estimated household composition 137 of the unknown household. Thus, the estimated household composition 137 of the unknown household is: 1 male age 45; 1 female age 47; 1 boy age 15; and 1 girl age 17. In instances where the IP address range of the geographic area includes a large number of known household compositions or known database proprietor household identifications, assigning a random household composition to the household 108 may provide more accurate results than, for example, averaging the household composition of the known household identifications of the IP addresses within that range of the geographic area. In some such instances, randomly selecting from a larger number of known household compositions (e.g., the IP addresses in range 47.198.18) compared to a smaller group of known household compositions (e.g., IP addresses in the range 47.198.12) may increase the probability that the randomly selected household composition accurately reflects the household composition of the unknown household.

Referring to FIG. 2A, the linkage database system 104 of the illustrated example updates the direct linkage database 126 and/or the supplemental household composition database 125 periodically or aperiodically. For example, the linkage database system 104 may update the direct linkage database 126 each time the client device 116 accesses a web page that includes the tag 202. In some examples, the linkage database system 104 of the illustrated example updates the information (e.g., the linkage mapping record 127) of the direct linkage database 126 daily, weekly, monthly, etc.

FIG. 2B shows another example linkage database system 250 that may be used to implement the audience measurement system 100 of FIG. 1. Those components of the example linkage database system 250 of FIG. 2B that are substantially similar or identical to the components of the example linkage database system 104 described above and that have functions substantially similar or identical to the functions of those components will not be described in detail again below. Instead, the interested reader is referred to the above corresponding description. To facilitate this process, similar reference numbers will be used for like structures. For example, the linkage database system 250 of the illustrated example includes the AME 201, the direct linkage database 126, the IP address-to-HH ID mapping of the linkage mapping record 127, the AME server 204, the database proprietor 210, the DP server 208 and the AME server 204 including the reporting message receiver 203, the AME ID determiner 205, the IP address identifier 207, the redirect instructor 209, the DP message reporting receiver 211, the filter 206, the demographic identifier retriever 213, and the mapper 215. The linkage database system 250 of the illustrated example includes the supplemental household composition database 135, the IP address-to-estimated household composition mapping 139 and the AME server 204 of the illustrated example includes an example demographic estimator 217. The demographic estimator 217 may estimate demographics of a household when the database proprietor 210 does not include a household/demographic identifier (e.g., an HH ID 132) associated with an IP address mapped to a database proprietor identifier (e.g., a DP cookie 130). Unlike the linkage database system 104 of FIGS. 1 and 2A, the linkage database system 250 of the illustrated example establishes the supplemental household composition database 135 during the direct linkage database build phase instead of during an OTT impression monitoring event as shown in FIGS. 1 and 2A.

While an example manner of implementing the linkage database system 104 of FIG. 1 is illustrated in FIGS. 2A and 2B, one or more of the elements, processes and/or devices illustrated in FIGS. 2A and 2B may be combined, divided, re-arranged, omitted, eliminated and/or implemented in any other way. Further, the example reporting message receiver 203, the example AME ID determiner 205, the example IP address identifier 207, the example redirect instructor 209, the example DP message reporting receiver 211, the example filter 206, the example demographic identifier retriever 213, the example mapper 215, the example demographic estimator 217 and/or, more generally, the example linkage database systems 104 and 250 of FIGS. 2A and 2B may be implemented by hardware, software, firmware and/or any combination of hardware, software and/or firmware. Thus, for example, any of the example reporting message receiver 203, the example AME ID determiner 205, the example IP address identifier 207, the example redirect instructor 209, the example DP message reporting receiver 211, the example filter 206, the example demographic identifier retriever 213, the example mapper 215, the example demographic estimator 217 and/or, more generally, the example linkage database systems 104 and 250 of FIGS. 2A and 2B could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reporting message receiver 203, the example AME ID determiner 205, the example IP address identifier 207, the example redirect instructor 209, the example DP message reporting receiver 211, the example filter 206, the example demographic identifier retriever 213, the example mapper 215, the example demographic estimator 217 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example linkage database system 104 of FIG. 1 may include one or more elements, processes and/or devices in addition to, or instead of, those illustrated in FIGS. 2A and 2B, and/or may include more than one of any or all of the illustrated elements, processes and devices.

Figure 20:
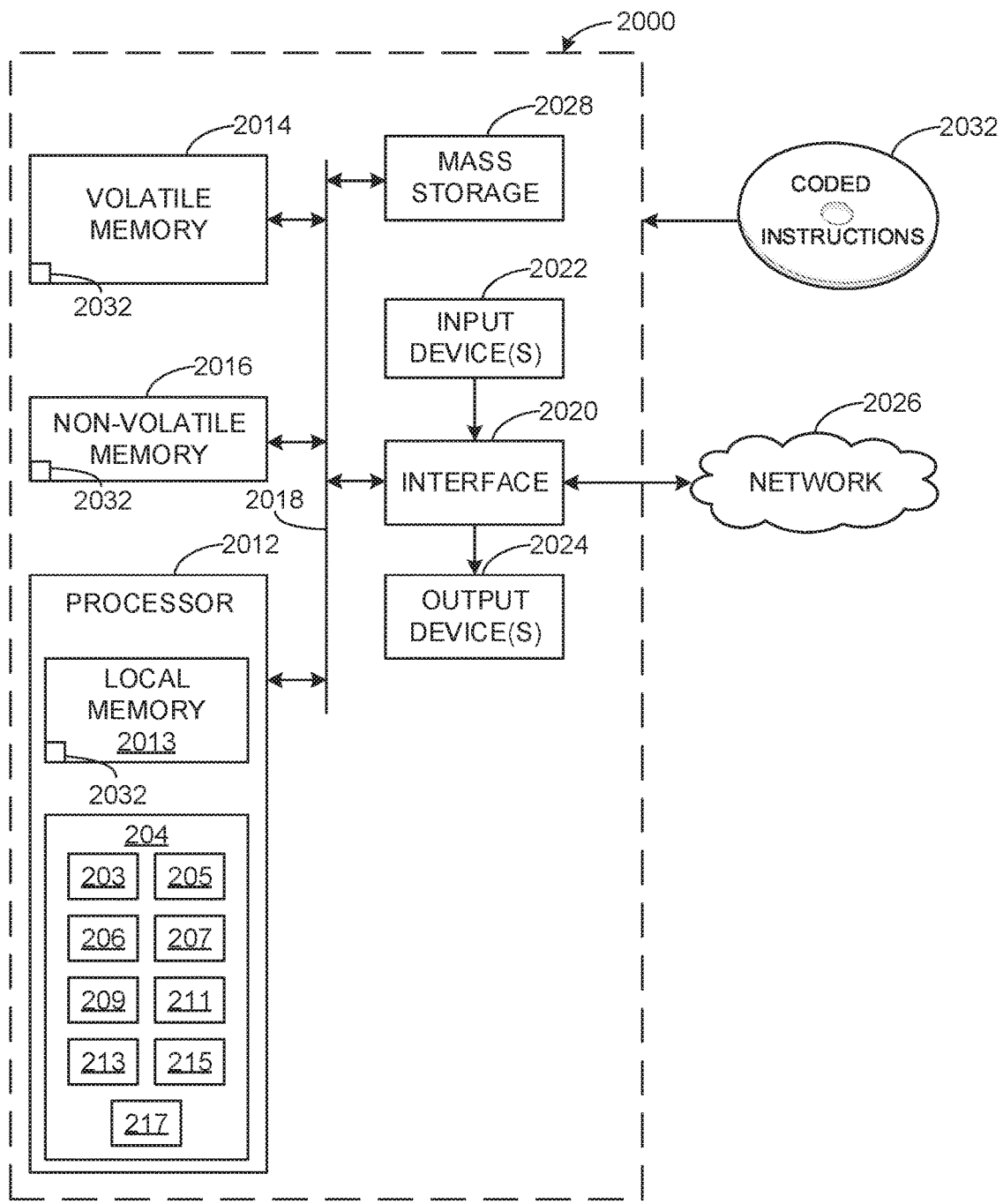
FIG. 20 is a block diagram of an example processor platform capable of executing instructions to implement the example methods and apparatus disclosed herein.

In examples disclosed herein, means for monitoring impression requests of an OTT device may be implemented by the example processor 2012 of FIG. 20. In examples disclosed herein, means for generating Internet protocol (IP) address-to-cookie mappings may be implemented by the example reporting message receiver 203, the AME ID determiner 205, the IP address identifier 207, the redirect instruction 209 and/or the DP message reporting receiver 211. In examples disclosed herein, means for associating household identifiers of households with ones of the IP address-to-cookie mappings may be implemented by the census collector 120, the harmonization system 122, the demographic identifier retriever 213 and/or the mapper 215. In examples disclosed herein, means for associating ones of the household identifiers to logged media impressions based on IP addresses associated with the media impressions and based on the household identifiers associated with the ones of the IP address-to-cookie mappings may be implemented by demographic retriever 124 and/or the mapper 215. In some examples, the mapper 215 provides means for associating the IP addresses corresponding to the households with cookies corresponding to media accesses from the households. In examples disclosed herein, the reporting message receiver 203 provides means for receiving cookies at the audience measurement entity from client devices (e.g., the client device 116) in the households (e.g., the media presentation environment 108). In some examples, the filter 206 provides means for filtering out some of the IP address-to-cookie mappings based on characteristics of the IP address-to-cookie mappings. In examples disclosed herein, means for associating demographic information with the logged media impressions based on the household identifiers may be implemented by the demographic retriever 124 and/or the demographic identifier retriever 213. In some examples, means for accessing the demographic information from a database based on the household identifiers that is stored in the database in association with the household identifiers may be implemented by the demographic retriever 124 and/or the demographic identifier retriever 213. In examples disclosed herein, means for identifying a characteristic of a first IP address assigned to a first household without a database proprietor household identification and means for identifying second IP addresses of the IP address-to-cookie mappings (e.g., where the second IP addresses identified based on having the same characteristic of the first IP address) may be implemented by the harmonization system 122 and/or the demographic identifier retriever 213. In some examples, the demographic retriever 124 and/or the demographic identifier retriever 213 provide means for retrieving known household composition information corresponding to second households associated with the second IP addresses. In some examples, the demographic retriever 124 and/or the demographic estimator 217 provides means for estimating a household composition of the first household associated with the first IP address based on the known household composition information associated with the second IP addresses. In examples disclosed herein, means for computing a mean of the known household composition information associated with the second IP addresses and means for randomly selecting from the known household composition information a known household composition associated with one of the second IP addresses are to be implemented by the demographic retriever 124 and/or the demographic estimator 217. In some examples, means for assigning the estimated household composition to each IP address that is within a same IP address range as the second IP addresses may be implemented by the mapper 215.

In some examples, means for building the direct linkage database 127 and/or the supplemental database 139 may be implemented by the example processor 2020 of FIG. 20. In examples disclosed herein, means for accessing a first reporting message from a client device coupled to a residential gateway having an internet protocol (IP) address may be implemented by the reporting message retriever 203. In examples disclosed herein, means for assigning an audience measurement entity (AME) identifier to the IP address provided by the received first reporting message may be implemented by the AME ID determiner 205 and/or the redirect instructor 209. In examples disclosed herein, means for sending a redirect instruction to the client device to cause the client device to send a second reporting message to a database proprietor (e.g., where the redirect instruction to include the AME identifier and the IP address) may be implemented by the redirect instructor 209. In examples disclosed herein, means for receiving a third reporting message from the database proprietor that includes a database proprietor (DP) identifier may be implemented by the DP message reporting receiver 211. In examples disclosed herein, means for mapping the AME identifier, the IP address and the DP identifier in the linkage mapping record 127 may be implemented by the mapper 215. In examples disclosed herein, means for requesting a household/demographic identifier from the database proprietor that is associated with the DP identifier may be implemented by the demographic retriever 124 and/or the demographic identifier retriever 213. In examples disclosed herein, means for storing the mapped AME identifier, the IP address, the DP identifier, and the household/demographic identifier in the linkage database 127 may be implemented by the mapper direct linkage database 126 and/or the non-volatile memory 2014 of FIG. 20. In examples disclosed herein, means for estimating a household composition in response to determining that the database proprietor does not have a household/demographic identifier corresponding to the DP identifier may be implemented by the demographic estimator 217. In examples disclosed herein, means for comparing the IP address of the client device with one or more IP addresses of the linkage mapping record, means for identifying one or more IP addresses of the linkage mapping record having one or more similar characteristics to the IP address, and means for obtaining one or more database proprietor household/demographic identifiers associated with the one or more identified IP addresses having the one or more similar characteristics may be implemented by the demographic identifier retriever 213. In examples disclosed herein, means for mapping the IP address with the one or more database proprietor household/demographic identifiers associated with the one or more IP addresses having the one or more similar characteristics may be implemented by the mapper 215.

In examples disclosed herein, means for monitoring an impression request from an OTT device may be implemented by the example processor 2020 of FIG. 20. In some examples, means for receiving an impression request from an over-the-top (OTT) device and/or means for identifying an internet protocol (IP) address associated with the impression request provided by the OTT device may be implemented by the census collector 120. In examples disclosed herein, means for accessing a database proprietor household/demographic identifier from a linkage mapping record that is associated with the identified IP address may be implemented by the harmonization system 122. In examples disclosed herein, means for requesting demographic information from a database proprietor based on the retrieved household/demographic identifier and/or means for associating the requested demographic information based on the household/demographic identifier to a viewer associated with the OTT device may be implemented by the demographic retriever 124. In examples disclosed herein, means for determining if the IP address associated with the impression request matches one or more IP addresses mapped in the linkage mapping record may be implemented by the harmonization system 122. In examples disclosed herein, means for estimating a household demographic in response to determining that the IP address associated with the impression request does not match the one or more IP addresses in the linkage mapping record may be implemented by the demographic retriever 124. In examples disclosed herein, means for identifying similar characteristics between the IP address associated with the impression request and the IP addresses in the linkage mapping record in response to the estimating of the household demographic may be implemented by the harmonization system 122. In examples disclosed herein, means for obtaining respective ones of database proprietor household/demographic identifiers associated with respective ones of the IP addresses identified with the similar characteristics as the IP address associated with the impression request and/or means for requesting demographic information from the database proprietor based on the database proprietor household/demographic identifiers may be implemented by the demographic retriever 124.

Flowcharts representative of example machine readable instructions for implementing the impression monitoring system 102 and/or the linkage database system 104 and/or 250 of FIGS. 2A and 2B are shown in FIGS. 3-19. In these examples, the machine readable instructions implement one or more programs for execution by a processor such as the processor 2012 shown in the example processor platform 2000 discussed below in connection with FIG. 20. The program(s) may be embodied in software stored on a non-transitory computer readable storage medium such as a CD-ROM, a floppy disk, a hard drive, a digital versatile disk (DVD), a Blu-ray disk, or a memory associated with the processor 2012, but the entirety of the program(s) and/or parts thereof could alternatively be executed by a device other than the processor 2012 and/or embodied in firmware or dedicated hardware. Further, although the example program(s) is/are described with reference to the flowcharts illustrated in FIGS. 3-7, many other methods of implementing the example linkage database system 104 and/or 250 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 3-19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 3:
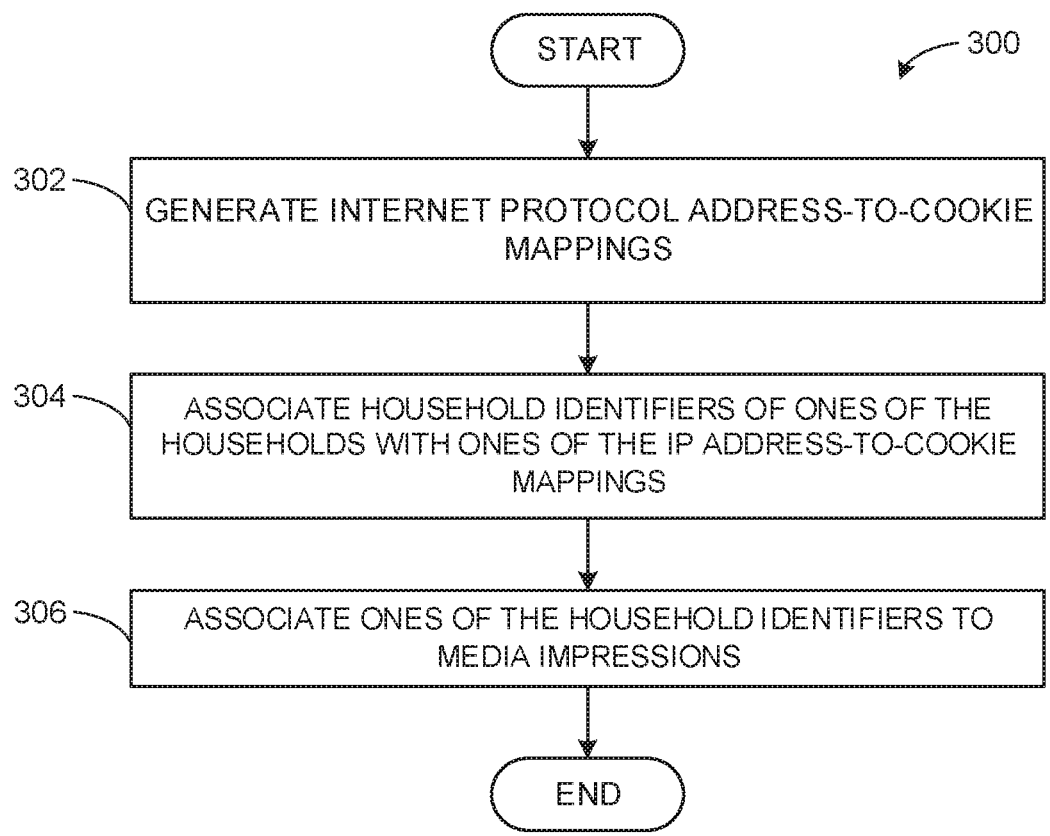
FIG. 3 is an example flowchart representative of example machine readable instructions for implementing the audience measurement system of FIGS. 1, 2A and 2B.

FIG. 3 is a flowchart representative of machine readable instructions for implementing the audience measurement system 100 of FIGS. 1, 2A and 2B. The program of FIG. 3 begins at block 302 when the linkage database system 104 or 250 generates internet protocol address-to-cookie mappings. For example, the linkage database system 104, 250 of the illustrated example creates or generates the linkage mapping record 127 (e.g., that includes IP address-to-AME cookie ID-to-DP cookie ID mapping) and/or the supplemental IP address-to-estimated household composition mapping 139 (e.g., that includes estimated demographic associated with an IP address).

The example linkage database system 104, 250 and/or the example AME server 204 then associates household identifiers of ones of the households with ones of the IP address-to-cookie mappings (block 304). For example, the AME ID determiner 205 determines an AME identifier (e.g., the AME cookie ID 128), the DP message reporting receiver 211 determines the database proprietor (DP) identifier (e.g., the DP cookie ID 130), and the IP address identifier 207 identifies the IP address 111 associated with the AME identifier. The mapper 215 associates the AME identifier, the DP identifier and the IP address 111 to form an IP address-to-cookie mapping. After the DP identifier is obtained, the AME server 204 via, for example, the demographic identifier retriever 213 and/or the demographic determiner 124 obtains household/demographic identifiers (e.g., the HH IDs 132) from the DP server 208 using the DP identifier provided in the linkage mapping record 127 and/or the supplemental IP address-to-estimated household composition mapping 139 that are associated with the IP address 111. In this manner, the mapper 215 can associate household identifiers with the IP address-to-cookie mappings at block 304.

The example impression monitoring system 102 associates ones of the household identifiers to media impressions (block 306). In the illustrated example, the impression monitoring system 102 associates the household/demographic identifiers (e.g., HH IDs) to media impressions logged for media accessed via over-the-top devices based on IP addresses associated with the media impressions and based on the associating of the household/demographic identifiers with the ones of the IP address-to-cookie mappings performed at block 304. For example, the census collector 120 identifies the IP address 111 of an impression associated with the OTT device 118, the harmonization system 122 retrieves a household/demographic identifier (e.g., a HH ID 132) from the IP address-to-cookie mappings of the linkage mapping record 127 and/or one or more household/demographic identifiers from the supplemental IP address-to-estimated household composition mapping 139 that is assigned to the IP address 111, and the demographic determiner 124 may request demographic information from the demographic database 134 using the demographic identifiers (e.g., the HH ID 132) associated with the IP address 111. In some examples, the harmonization system 122 retrieves an estimated demographic household composition 137 from the supplemental IP address-to-estimated household composition mapping 139 that is assigned to the IP address 111.

Figure 4:
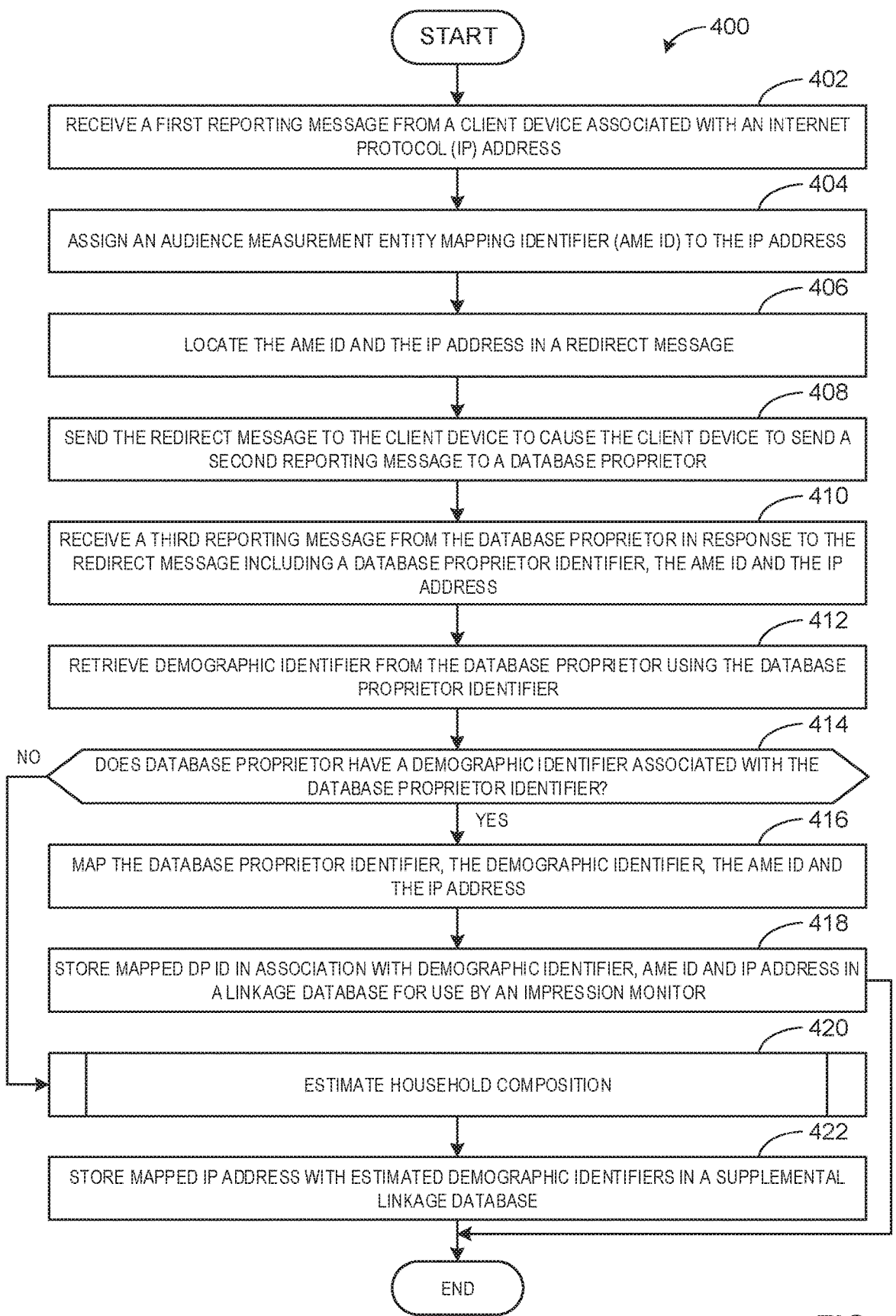
FIGS. 4-5 are flowcharts representative of example machine readable instructions for implementing the example linkage database systems of FIGS. 1, 2A and 2B.

FIG. 4 is a flowchart representative of machine readable instructions for building the direct linkage database 126 and/or the supplemental household composition database 135 of FIGS. 1, 2A and 2B. The process begins at block 402 when the example reporting message receiver 203 of the AME server 204 receives a first reporting message from the client device 116 that is associated with the IP address 111. For example, the client device 116 may access a website having beacon instructions that cause the client device 116 to send a reporting message (e.g., a cookie reporting message) through the residential gateway 110 to the example AME server 204. In this manner, the reporting message receiver 203 may receive the AME cookie 128 in the reporting message from the client device 116.

The example AME ID determiner 205 assigns an audience measurement entity mapping identifier (e.g., an AME cookie ID) to the IP address 111 (block 404). For example, the IP address identifier 207 identifies the IP address 111 associated with the first reporting message and the AME ID determiner 205 assigns an AME cookie ID to the IP address 111 based on the AME cookie 128 received by the reporting message receiver 203. The example redirect instructor 209 locates the AME ID and the IP address 111 in a redirect message or instruction (block 406). The example redirect instructor 209 sends the redirect message to the client device 116 to cause the client device 116 to send a second reporting message to the database proprietor 210 (block 408). The example DP message reporting receiver 211 receives a third reporting message from the database proprietor 210 in response to the redirect message that includes a database proprietor identifier, the AME ID and the IP address 111 (block 410). For example, the database proprietor identifier may be the DP cookie 130 provided by the database proprietor 210.

The example demographic identifier retriever 213 retrieves a demographic identifier from the database proprietor 210 using the database proprietor identifier (block 412). For example, the demographic identifier retriever 213 may retrieve the household/demographic identifier (e.g., the HH ID 132) associated with the DP cookie 130 from the database proprietor 210. In some examples, the mapper 215 maps the AME cookie 128, the IP address 111, the DP cookie 130 and the HH ID 132 in the linkage mapping record 127.

In some examples, the demographic identifier retriever 213 and/or the AME server 204 determines if the database proprietor 210 includes a household/demographic identifier associated with the DP identifier (block 414). For example, the demographic identifier retriever 213 determines if the database proprietor 210 includes an HH ID 132 associated with the DP cookie 130. If the demographic identifier retriever 213 determines at block 414 that the database proprietor 210 includes a household/demographic identifier associated with the database proprietor identifier, the example mapper 215 maps the database proprietor identifier, the household/demographic identifier, the AME ID and the IP address 111 (block 416). For example, the mapper 215 maps the AME cookie 128, the IP address 111, the DP cookie 130 and the HH ID 132 in the linkage mapping record 127. The example AME server 204 stores the mapped database proprietor identifier in association with the household/demographic identifier, the AME ID and the IP address in the direct linkage database 126 for use by the impression monitoring system 102 (block 418).

Referring again to block 414, if the demographic identifier retriever 213 determines that the database proprietor 210 does not include a household/demographic identifier associated with the database proprietor identifier, the example demographic estimator 217 estimates a household composition (block 420). For example, the demographic estimator 217 may estimate or determine a household composition by using one or more household compositions (e.g., demographics) associated with known database proprietor household identifications (HH IDs) in the linkage mapping record 127. An example process that may be used to implement block 420 is described below in connection with FIG. 5. The example AME server 204 stores the mapped IP address in association with estimated household/demographic identifiers in the supplemental linkage database 135 (block 422) for use by the impression monitoring system 102.

Figure 5:
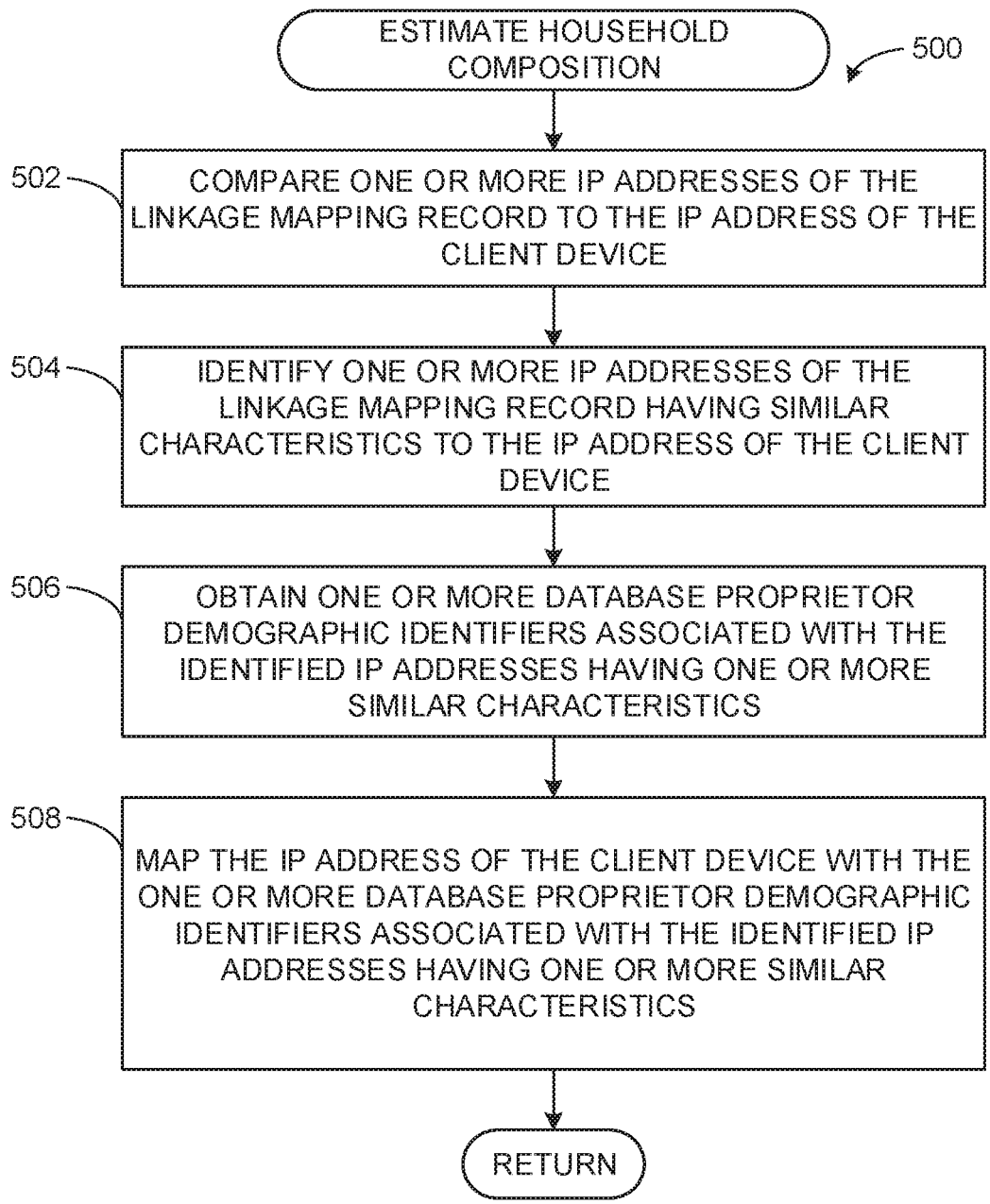

FIG. 5 is an example process 500 that may implement the example estimate household composition block 420 of FIG. 4. The example demographic estimator 217 compares (e.g., via a comparator) one or more IP addresses of the linkage mapping record 127 to the IP address 111 of the client device (block 502). The example demographic estimator 217 identifies one or more IP addresses of the linkage mapping record 127 having similar characteristics to the IP address 111 (block 504). For example, the demographic estimator 217 may compare one or more sets of octets (e.g., the first three octets) or allocation blocks of the IP address 111 to one or more sets of octets (e.g., the first three octets) or allocation blocks of the IP addresses in the linkage mapping record 127. The example demographic identifier retriever 213 obtains, requests or retrieves one or more database proprietor household/demographic identifiers (e.g., HH IDs 132) associated with the identified IP addresses having one or more similar characteristics (block 506). For example, the demographic identifier retriever 213 obtains one or more DP identifiers (e.g., DP cookies 130) from the linkage mapping record 127 associated with the identified one or more IP addresses having similar characteristics as the IP address 111 of the client device 116, and the demographic estimator 217 requests the household/demographic identifiers (e.g., HH IDs 132) from the database proprietor 210 based on the DP identifiers (e.g., the DP cookies 130). The example mapper 215 maps the IP address 111 of the client device 116 with the one or more database proprietor household/demographic identifiers associated with the identified IP addresses having the similar characteristics to provide estimated household/demographic identifiers (block 508). In this manner, the demographic estimator 217 provides estimated household/demographic identifiers based on the associated database proprietor identifiers (e.g., the DP cookie IDs 130). In some examples, the demographic estimator 217 does not obtain the household/demographic identifiers (e.g., the HH IDs 132) from the database proprietor 210. Instead, the mapper 215 maps the IP address 111 of the client device 116 with the one or more DP identifiers (e.g., the DP cookies 130) associated with the identified IP addresses having the similar characteristics. In some such examples, the impression monitoring system 102 may obtain one or more household/demographic identifiers using the database proprietor identifiers from the database proprietor 210 during an impression monitoring event.

Figure 6:
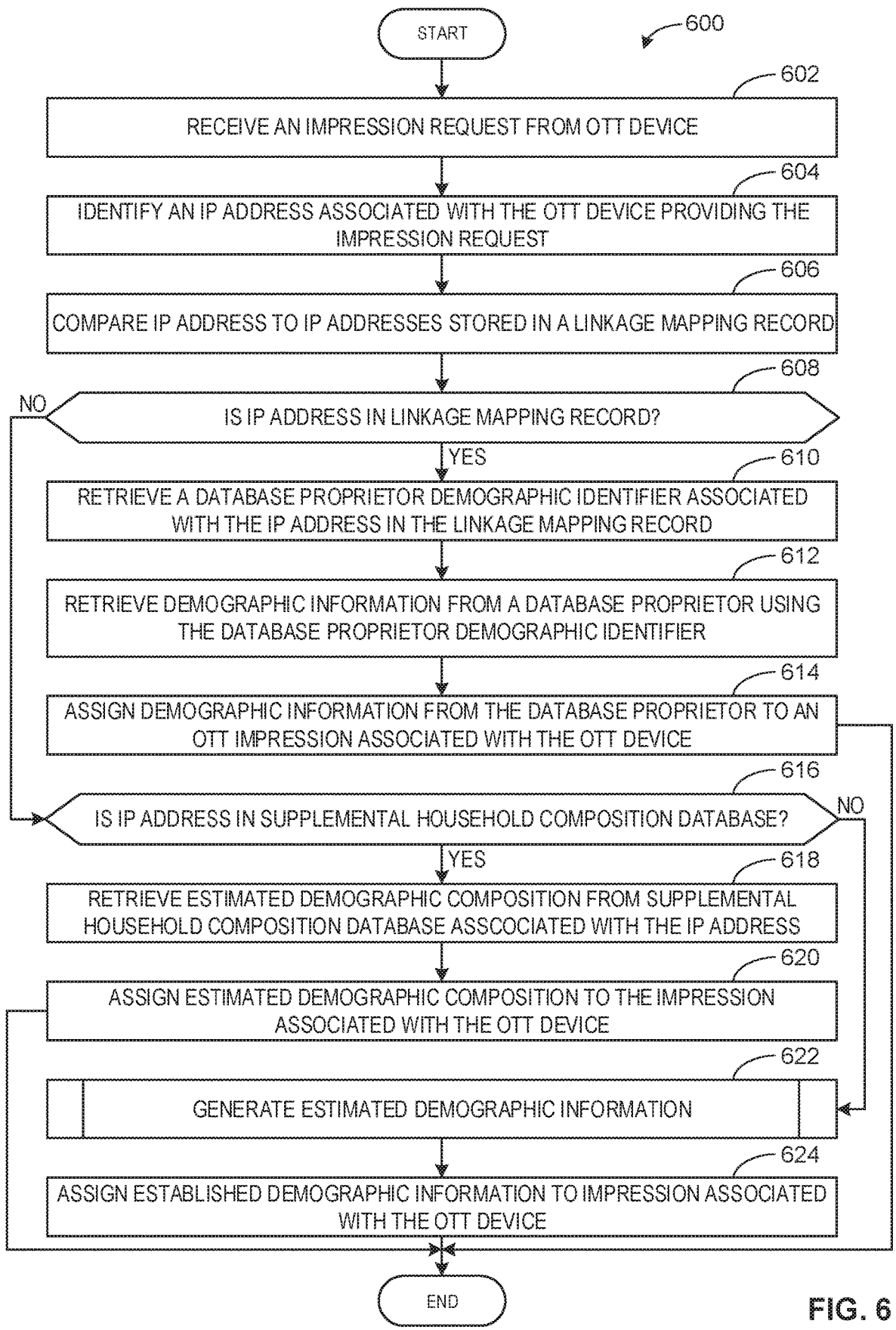
FIGS. 6-7 are flowcharts representative of example machine readable instructions for implementing an impression monitoring system of the example audience measurement system of FIGS. 1, 2A and 2B.

FIG. 6 illustrates an example process 600 that may be employed by the impression monitoring system 102 of FIG. 1 to associate demographics with an impression request from an OTT device. Referring to FIG. 6, the example census collector 120 receives an impression request from the OTT device 118 of the household 108 (block 602). The example census collector 120 identifies the IP address 111 associated with the OTT device 118 providing the impression request (block 604). The example harmonization system 122 compares the IP address 111 to IP addresses stored in the linkage mapping record 127 (block 606). The example harmonization system 122 determines if the IP address 111 matches an IP address stored in the linkage mapping record 127 (block 608).

If the example harmonization system 122 determines at block 608 that the IP address 111 matches an IP address stored in the linkage mapping record 127, the harmonization system 122 retrieves a database proprietor household/demographic identifier associated with the IP address 111 in the linkage mapping record 127 (block 610). In some examples, the database proprietor household/demographic identifier includes at least one of the DP cookie 130 or the HH ID 132. The example demographic determiner 124 retrieves the demographic information from the database proprietor 210 using the database proprietor household/demographic identifier (block 612). For example, the demographic determiner 124 may obtain, request or retrieve the demographic information from the demographic database 134 of the database proprietor 210. The example demographic determiner 124 assigns the demographic information from the database proprietor 210 to the OTT impression associated with the OTT device 118 that was received by the census collector 120 (block 614).

If the example harmonization system 122 determines at block 608 that the IP address 111 does not match an IP address stored in the linkage mapping record 127, the example harmonization system 122 determines if the IP address is in the supplemental household composition database 135 (block 616). For example, the supplemental household composition database 135 may be provided by the linkage database system 104 and/or 250 of FIGS. 1, 2A and 2B. If the example harmonization system 122 determines that the IP address 111 is in the supplemental household composition database 135 at block 616, the example harmonization system 122 retrieves the estimated demographic composition from the supplemental household composition database 135 (block 618). The example demographic determiner 124 assigns the estimated demographic composition from the supplemental household composition database 135 to the OTT impression associated with the OTT device 118 (block 620).

If the example harmonization system 122 determines at block 616 that the IP address 111 is not in the supplemental household composition database 135, the example demographic determiner 124 and/or more generally the AME 201 generates estimated demographic information (block 622). An example process that may be used to implement block 622 is described below in connection with FIG. 7. The example demographic determiner 124 assigns the established estimated demographic information to the OTT impression associated with the OTT device 118 (block 624). The example process of FIG. 6 ends.

Figure 7:
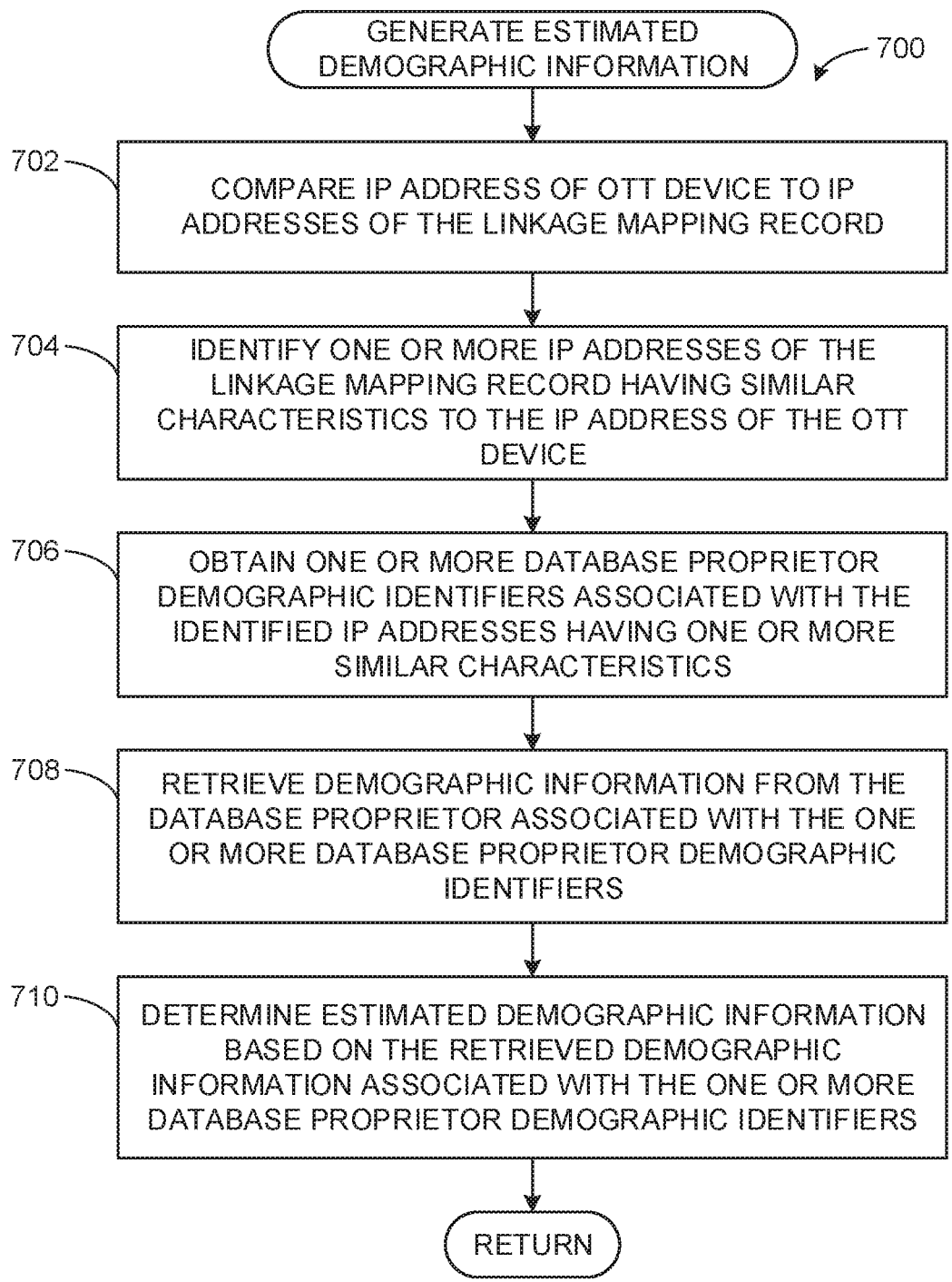

FIG. 7 illustrates an example process 700 that may be used to generate estimated demographic information to implement block 622 of FIG. 6. The example harmonization system 122 compares the IP address 111 of the OTT device 118 to IP addresses of the linkage mapping record 127 (block 702). The example harmonization system 122 identifies one or more IP addresses of the linkage mapping record 127 having similar characteristics to the IP address 111 (block 704). For example, the harmonization system 122 may compare one or more sets of octets (e.g., the first three octets) or allocation blocks of the IP address 111 to one or more sets of octets (e.g., the first three octets) or allocation blocks of the IP addresses in the linkage mapping record 127. The example harmonization system 122 may obtain one or more database proprietor household/demographic identifiers (e.g., DP cookies 130 and/or the HH IDs 132) associated with the identified IP addresses having one or more similar characteristics (block 706). For example, the harmonization system 122 may obtain one or more DP identifiers (e.g., DP cookies 130) from the linkage mapping record 127 associated with the identified one or more IP addresses having similar characteristics as the IP address 111 of the OTT device 118. The example demographic determiner 124 requests or retrieves the demographic information from the demographic database 134 of the database proprietor 210 using the household/demographic identifiers (e.g., the DP cookies 130 and/or the HH IDs 132) (block 708). The example demographic determiner 124 determines, generates or establishes estimated demographic information based on the retrieved demographic information associated with the one or more database proprietor household/demographic identifiers (block 710). In some examples, the demographic determiner 124 may establish estimated demographic information by determining a mean composition of a household associated with the IP address 111 based on a plurality of household/demographic identifiers mapped to IP addresses of the linkage mapping record 127 having similar IP address characteristics. In some examples, the demographic determiner 124 may establish estimated demographic information by randomly selecting a database proprietor household/demographic identifier from an IP address having similar characteristics to the IP address 111 of the OTT device 118.

FIGS. 8-19 illustrate examples of an audience measurement system (e.g., the audience measurement system 100 of FIG. 1). More specifically, the example implementation is presented with the The Nielsen Company, LLC as the audience measurement entity (e.g., the AME) and Experian as the database proprietor (e.g., the database proprietor 210). The examples of FIGS. 8-13 are based on IP addresses assigned to households having known database proprietor household identifications (e.g., known household composition). The examples of FIGS. 14-19 are based on IP addresses assigned to households that do not have database proprietor household identifications (e.g., unknown household composition).

Figure 8:
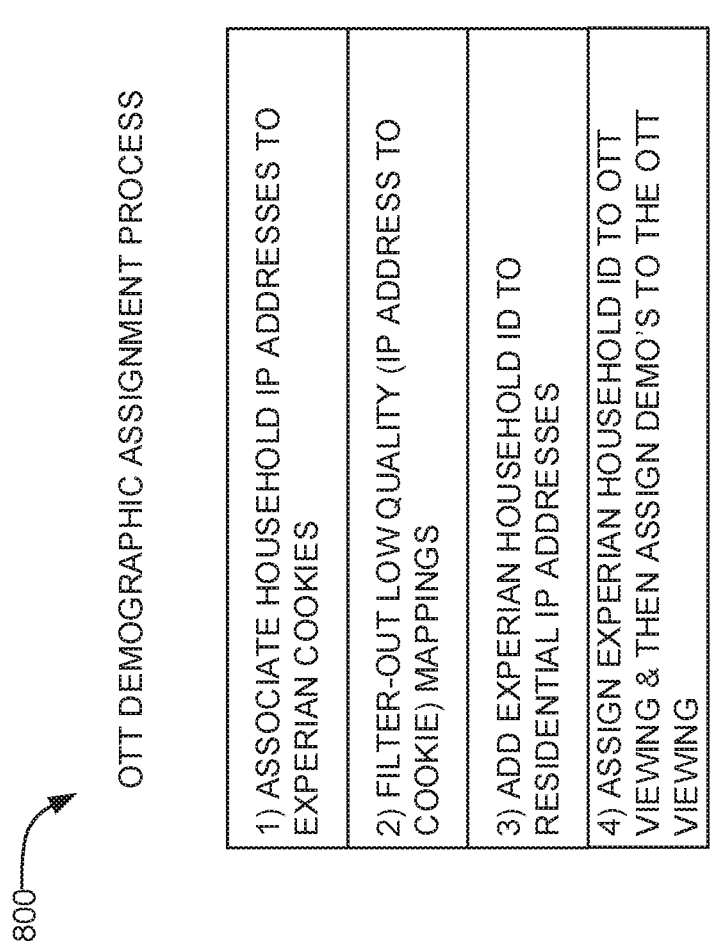
FIG. 8 illustrates an example OTT demographic assignment process disclosed herein.
Figure 9B:
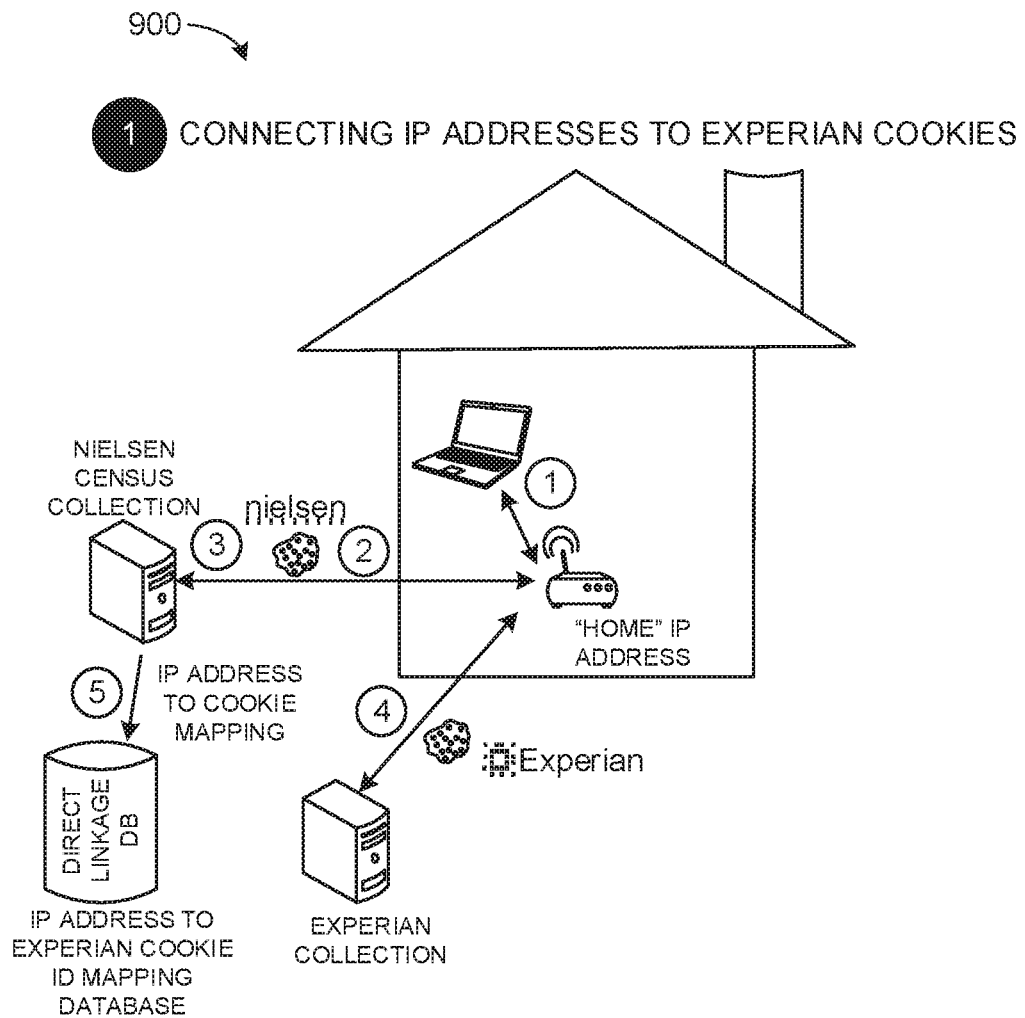
FIG. 9B illustrates an example communication flow to map a residential IP address to a database proprietor cookie.
Figure 12A:
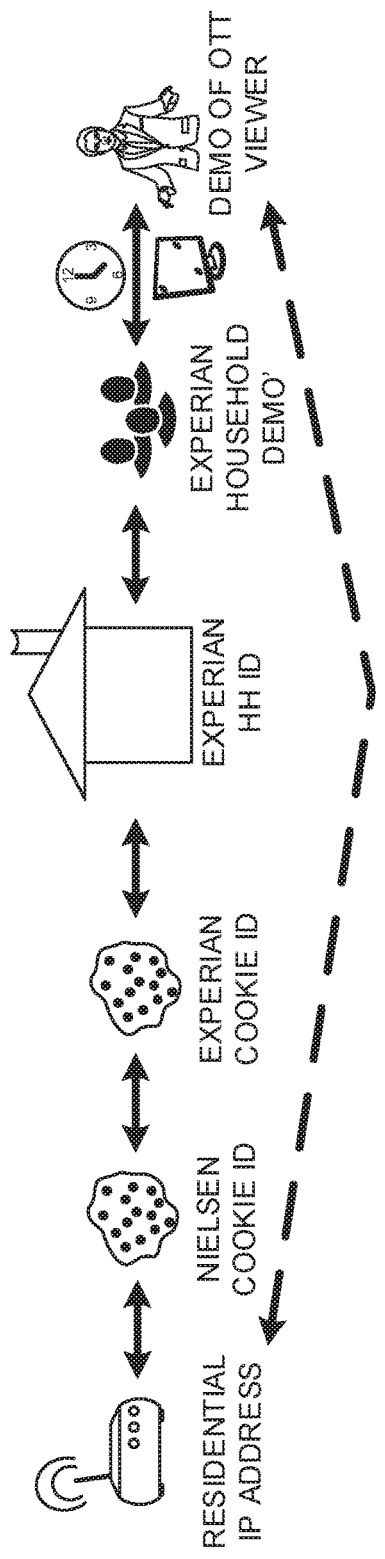
FIG. 12A illustrates an example OTT demographic assignment process of FIG. 8 to assign household demographics provided by a database proprietor to OTT media impressions.
Figure 12B:
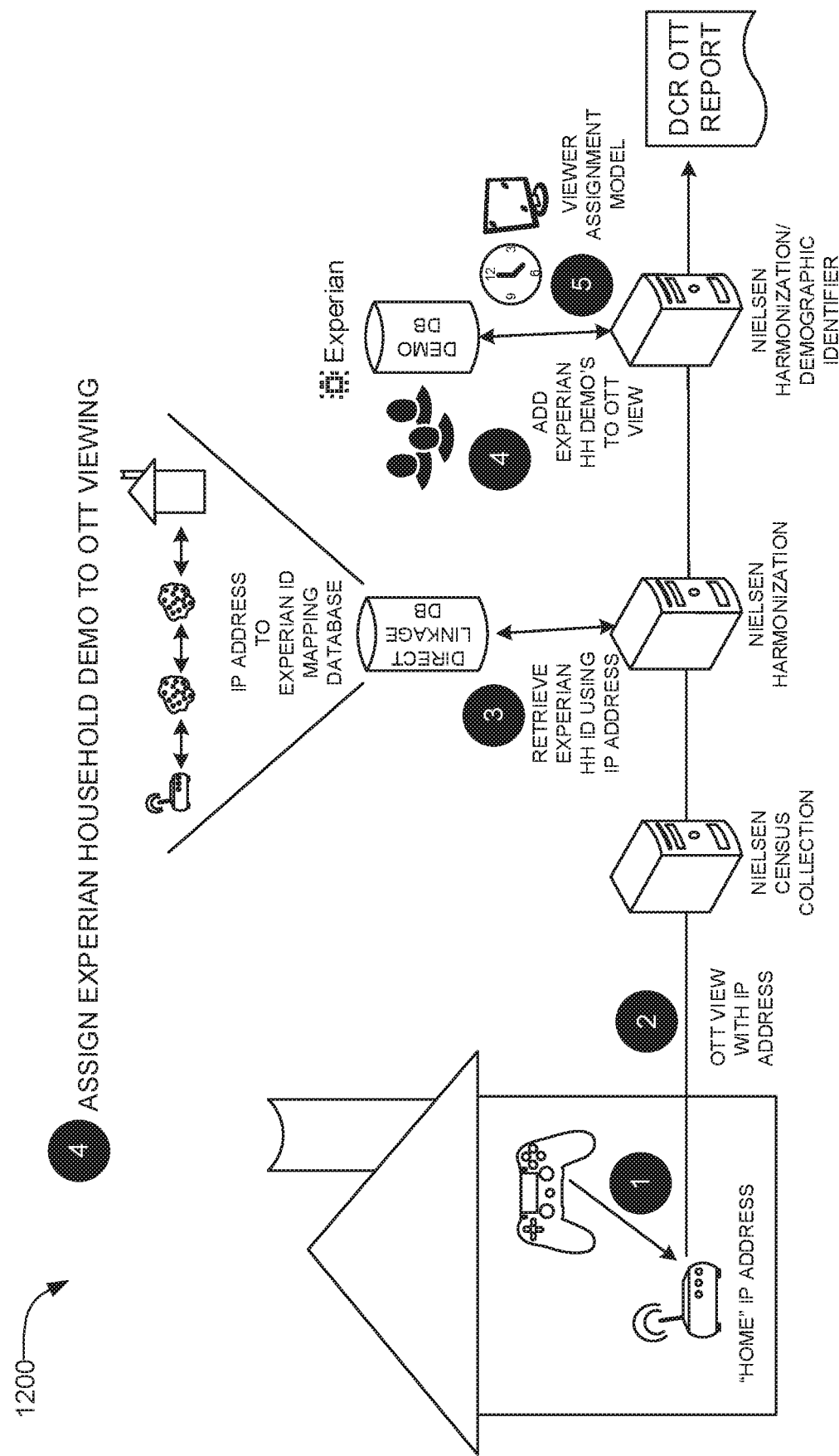
FIG. 12B is an example communications flow for assigning household demographics to OTT media impressions.
Figure 13:
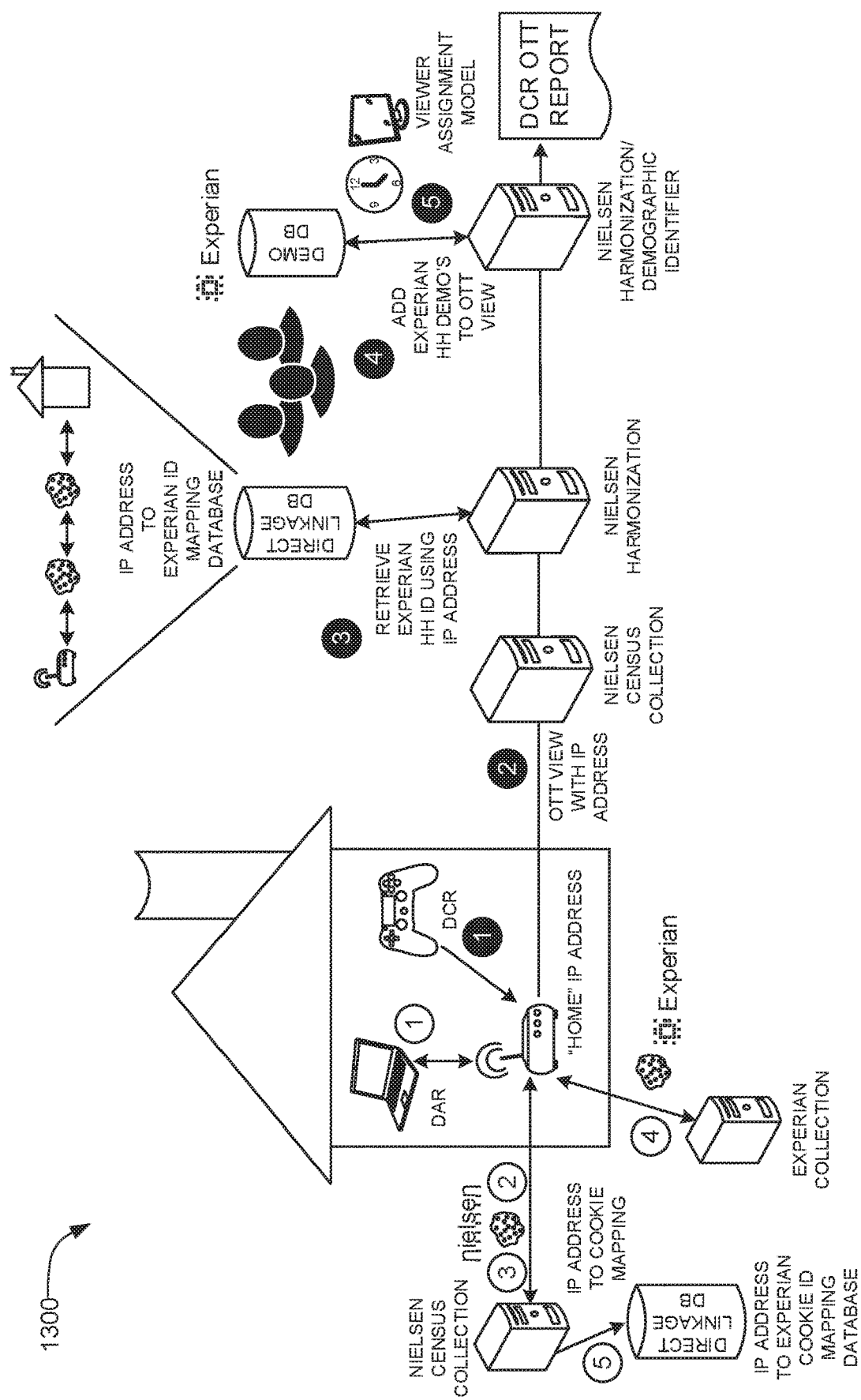
FIG. 13 is an overall audience measurement system implemented by an audience measurement entity and a database proprietor.
Figure 18:
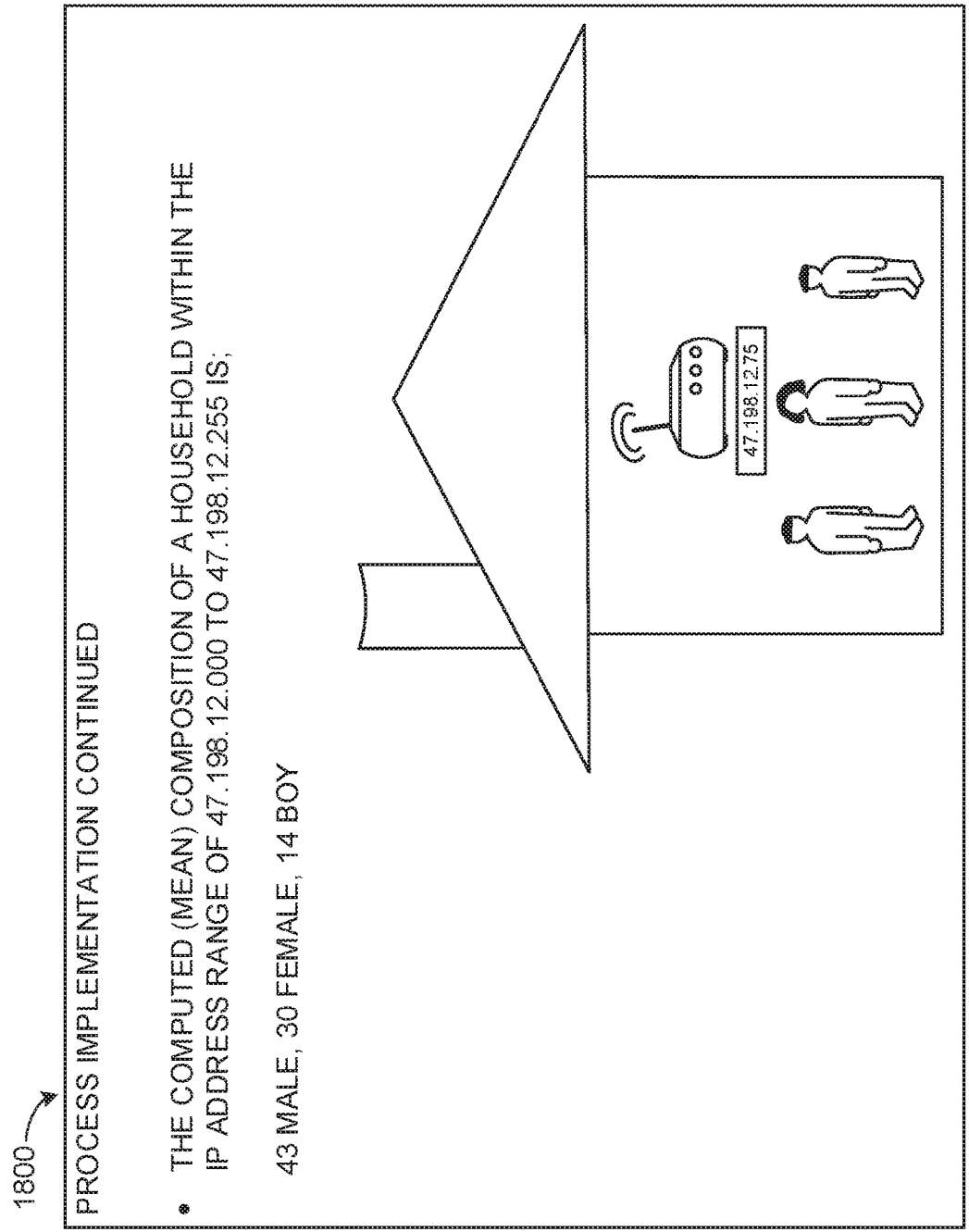

FIG. 8 illustrates an example OTT demographic assignment process 800. The process 800 of FIG. 8 is an overview and each sub-process 1-4 referenced in FIG. 8 is illustrated in greater detail in FIGS. 9A, 9B, 10, 11, 12A, 12B and 13. To facilitate review, each of the figures includes a number identified in a circle that is representative of the sub-processes 1-4 shown in FIG. 8. FIG. 9A illustrates an example process 900 (e.g., sub-process 1 of FIG. 8) for mapping a residential IP addresses (e.g., the IP address 111 of FIGS. 1, 2A and 2B) to Experian Cookies (e.g., the DP cookie 130 of FIGS. 1, 2A and 2B). FIG. 9B illustrates an example communication flow to map a residential IP address (e.g., the IP address 111 of FIGS. 1, 2A and 2B) to an Experian cookie (e.g., the DP cookie 130 of FIGS. 1, 2A and 2B). FIG. 10 illustrates an example process 1000 (e.g., sub-process 2 of FIG. 8) for filtering out low quality IP address-to-cookie mappings. FIG. 11 illustrates an example process 1100 (e.g., sub-process 3 of FIG. 8) for mapping the Experian Household ID (e.g., the HH ID 132) to IP addresses (e.g., the IP address 111). FIG. 12A illustrates an example 1300 (e.g., sub-process 4 of FIG. 8) to assign Experian household demographics to OTT media impressions. FIG. 12B is an example communications flow for assigning household demographics to OTT media impressions. FIG. 13 is an overall audience measurement system implemented by Nielsen (e.g., the AME 201 of FIG. 2A) and Experian (e.g., the database proprietor 210 of FIG. 2A).

FIG. 14 is an overview of estimating household composition for households that do not have Experian household identifications. FIGS. 15-19 provide examples of determining an estimated household composition for an unknown household based on known household compositions of households in the same IP address range as the IP address of the unknown household.

FIG. 20 is a block diagram of an example processor platform 2000 capable of executing instructions to implement the example methods and apparatus disclosed herein. For example, the processor platform 2000 may implement the examples shown in FIGS. 1-19. The processor platform 2000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer. The hardware processor may be a semiconductor based (e.g., silicon based) device. In this example, the processor 2012 implements the reporting message receiver 203, the AME ID determiner 205, the IP address identifier 207, the redirect instructor 209, the DP message reporting receiver 211, the filter 206, the demographic identifier retriever 213, the mapper 215 and/or more generally the AME server 204.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

Coded instructions 2032 to implement the computer readable instructions represented by FIGS. 3-19 may be stored in the mass storage device 2028, in the volatile memory 2014, in the non-volatile memory 2016, and/or on a removable tangible computer readable storage medium such as a CD or DVD. In some examples, the direct linkage database 126 and/or the supplemental database 139 may be implemented by the volatile memory 2014, the non-volatile memory 2016 and/or the mass storage 2028.

Examples disclosed herein enable audience measurement entities to monitor impression requests from an OTT device using (e.g., only) an IP address associated with an OTT device. More specifically, the example methods and apparatus disclosed herein enable monitoring impressions from OTT devices without requiring registration of an OTT device. Additionally, example methods and apparatus enable monitoring impression requests from OTT devices without requiring a viewer associated with the OTT device to register as a panelist with the audience monitoring entity. In some examples, an audience measurement entity may obtain demographic composition of a household from which an OTT device generates an impression request without requiring the household to register with the audience measurement entity and/or without requiring registration or knowledge of one or more identification features (e.g. a device ID, a serial number, etc.) associated with the OTT device. In other words, the examples disclosed herein enable an audience measurement entity to determine demographics associated with an impression request of an OTT device using only an IP address that is associated with the household from which the OTT device sends the impression request. Unlike prior techniques, which require registration of the OTT device and/or a panelist with the audience measurement systems, examples disclosed herein enable an audience measurement entity to determine demographic composition of a household associated with an impression request from an OTT device without requiring registration of the OTT device and/or a viewer/panelist of the household. In some examples, the audience measurement entity may determine the demographic composition of a household associated with an impression request of an OTT device without knowledge of the view of the household.

Although certain example methods, apparatus and articles of manufacture have been disclosed herein and the attached appendices, the scope of coverage of this patent is not limited thereto. On the contrary, this patent covers all methods, apparatus and articles of manufacture fairly falling within the scope of the claims of this patent.

What is claimed is:

1. An apparatus comprising:
reporting message receiver circuitry to receive a first reporting message from a client device coupled to a residential gateway having an internet protocol (IP) address;
AME ID determiner circuitry to assign an audience measurement entity (AME) identifier (ID) to the IP address provided by the first reporting message, the assigning to be performed using criteria other than data identifying a preexisting registration of the IP address with a user account registered with the AME;
redirect instructor circuitry to send a redirect instruction to the client device to cause the client device to send a second reporting message to a database proprietor, the redirect instruction to include the AME identifier and the IP address; and
DP message reporting receiver circuitry to receive, after the sending of the redirect instruction, a third reporting message from the database proprietor that includes a database proprietor (DP) identifier.

2. The apparatus as defined in claim 1, further including mapper circuitry to map the AME identifier, the IP address and the DP identifier in a linkage mapping record.

3. The apparatus as defined in claim 1, further including demographic identifier retriever circuitry to request a demographic identifier from the database proprietor that is associated with the DP identifier.

4. The apparatus as defined in claim 3, wherein the DP message reporting receiver circuitry is to receive a DP cookie, and the demographic identifier circuitry includes a household identification (HH ID).

5. The apparatus as defined in claim 3, further including mapper circuitry to map the AME identifier, the IP address, the DP identifier, and the demographic identifier in a linkage mapping record.

6. The apparatus as defined in claim 1, wherein the reporting message receiver circuitry or the AME ID determiner circuitry is to receive a cookie reporting message associated with the AME that is based on beacon instructions from a website accessed from a web browser of the client device after the receiving of the first reporting message.

7. The apparatus as defined in claim 1, wherein the AME ID determiner circuitry is to assign an AME cookie ID of an AME cookie to the IP address associated with the first reporting message.

8. The apparatus of claim 1, wherein the IP address is to be provided without an association with a user account registered with the residential gateway.

9. The apparatus of claim 1, wherein the assigning is to be performed without using data identifying a preexisting registration of the IP address with a user account registered with the AME.

10. A non-transitory computer readable medium comprising instructions to cause at least one processor to at least:
access a first reporting message from a client device coupled to a residential gateway having an internet protocol (IP) address;
assign an audience measurement entity (AME) identifier (ID) to the IP address provided by the first reporting message;
cause transmission of a redirect instruction to the client device to cause the client device to send a second reporting message to a database proprietor, the redirect instruction to include the AME identifier and the IP address;
access, after the transmission of the redirect instruction, a third reporting message from the database proprietor that includes a database proprietor (DP) identifier; and
map the AME identifier, the IP address and the DP identifier in a linkage mapping record using criteria other than a preexisting registration of the IP address with a user account.

11. The non-transitory computer readable medium as defined in claim 10, wherein the instructions are further to cause the at least one processor to request a demographic identifier from the database proprietor that is associated with the DP identifier.

12. The non-transitory computer readable medium as defined in claim 11, wherein the instructions are further to cause the at least one processor to access a DP cookie and a household identification (HH ID).

13. The non-transitory computer readable medium as defined in claim 11, wherein the instructions are further to cause the at least one processor to map the AME identifier, the IP address, the DP identifier, and the demographic identifier in a linkage mapping record.

14. The non-transitory computer readable medium as defined in claim 11, wherein the instructions are further to cause the at least one processor to access a cookie reporting message associated with the AME, the cookie reporting message based on beacon instructions from a website accessed from a web browser of the client device.

15. The non-transitory computer readable medium as defined in claim 11, wherein the instructions are further to cause the at least one processor to assign an AME cookie ID of an AME cookie to the IP address associated with the first reporting message.

16. A method comprising:
    accessing, by executing an instruction with a processor, a first reporting message from a client device coupled to a residential gateway having an internet protocol (IP) address, the IP address to be provided without an association with a user account registered with the residential gateway;
    assigning, by executing an instruction with the processor, an audience measurement entity (AME) identifier (ID) to the IP address provided by the first reporting message;
    causing, by executing an instruction with the processor, transmission of a redirect instruction to the client device to cause the client device to send a second reporting message to a database proprietor, the redirect instruction to include the AME identifier and the IP address;
    accessing, after the transmission of the redirect instruction, a third reporting message from the database proprietor that includes a database proprietor (DP) identifier; and
    mapping, by executing an instruction with the processor, the AME identifier, the IP address and the DP identifier in a linkage mapping record, the mapping of the AME identifier, the IP address and the DP identifier performed using criteria other than data identifying a preexisting registration of the IP address with a user account.

17. The method as defined in claim 16, further including requesting a demographic identifier from the database proprietor that is associated with the DP identifier.

18. The method as defined in claim 17, further including storing the mapped AME identifier, the IP address, the DP identifier, and the demographic identifier in a linkage database.

19. The method as defined in claim 18, further including estimating a household composition after determining that the database proprietor does not have the demographic identifier corresponding to the DP identifier.

20. The method as defined in claim 19, further including, after estimating the household composition:
    comparing the IP address of the client device with one or more IP addresses of the linkage mapping record;
    identifying one or more IP addresses of the linkage mapping record based on a first characteristic of the one or more IP addresses matching a second characteristic of the IP address;
    obtaining one or more database proprietor demographic identifiers associated with the one or more identified IP addresses; and
    mapping the IP address with the one or more database proprietor demographic identifiers associated with the one or more IP addresses.

* * * * *